United States Patent [19]

Yasuhara et al.

[11] Patent Number: 5,425,133
[45] Date of Patent: Jun. 13, 1995

[54] ROBOT APPARATUS WITH AN ELECTRICAL DRIVER FOR CONTROLLING A DETACHABLE ROTOR HAND

[75] Inventors: Masateru Yasuhara, Kawasaki; Hiroyuki Kigami, Yokohama; Katsumi Ishihara, Yokohama; Yusaku Azuma, Yokohama; Teiji Oosaka, Ushiku, all of Japan

[73] Assignee: Canon Kabushiki Kaisha, Tokyo, Japan

[21] Appl. No.: 101,820

[22] Filed: Aug. 4, 1993

Related U.S. Application Data

[63] Continuation of Ser. No. 644,610, Jan. 23, 1991, abandoned.

[30] Foreign Application Priority Data

Jan. 24, 1990 [JP] Japan .................................. 2-012460
Jun. 4, 1990 [JP] Japan .................................. 2-146434

[51] Int. Cl.$^6$ ........................ B25J 18/04; G06F 15/46
[52] U.S. Cl. ........................................ 395/84; 395/80;
395/86; 901/2; 901/15; 901/19; 901/23;
901/28; 901/31; 318/568.21; 414/744.5
[58] Field of Search ................. 395/84, 86, 80; 901/2,
901/7, 28, 30, 31, 32, 19, 15, 23; 318/640,
568.13, 568.14, 568.16, 568.21; 341/100;
414/744.5

[56] References Cited

U.S. PATENT DOCUMENTS

| 4,001,556 | 1/1977 | Folchi et al. ........................ 395/93 |
| 4,287,459 | 9/1981 | Dahlström ...................... 318/568.14 |
| 4,293,268 | 10/1981 | Mink ...................................... 901/31 |
| 4,314,524 | 2/1982 | Deguchi ................................. 901/7 |
| 4,432,063 | 2/1984 | Resnick ........................... 318/568.13 |
| 4,488,241 | 12/1984 | Hutchins et al. ....................... 395/84 |
| 4,538,639 | 9/1985 | Inaba et al. ............................ 137/580 |
| 4,631,689 | 12/1986 | Arimura et al. ........................ 901/2 |
| 4,633,155 | 12/1986 | Komiya et al. ...................... 318/640 |
| 4,664,588 | 5/1987 | Newell et al. ........................ 901/29 |
| 4,672,281 | 6/1987 | Yagusic et al. ................. 318/568.21 |
| 4,696,501 | 9/1987 | Webb ...................................... 901/32 |
| 4,737,697 | 4/1988 | Maruo et al. ................... 318/568.14 |
| 4,894,595 | 1/1990 | Sagawa et al. ................. 318/568.16 |
| 4,909,108 | 3/1990 | Nakoda et al. ........................ 83/789 |
| 4,951,517 | 8/1990 | Azuma et al. ..................... 414/744.5 |
| 4,979,949 | 12/1990 | Matsen, III et al. .................. 395/80 |
| 4,990,022 | 2/1991 | Watanabe et al. .................... 901/28 |
| 5,000,653 | 3/1991 | Gosdowski .......................... 901/15 |
| 5,032,975 | 8/1991 | Yamamoto et al. ................. 364/134 |
| 5,046,915 | 9/1991 | Azuma et al. ..................... 414/744.5 |

FOREIGN PATENT DOCUMENTS 58186589 10/1983 Japan .
0105404 5/1991 Japan ............................. 318/568.14

Primary Examiner—Allen R. MacDonald
Assistant Examiner—George Davis
Attorney, Agent, or Firm—Fitzpatrick, Cella, Harper & Scinto

[57] ABSTRACT

A robot apparatus includes a robot arm, a robot hand, an electrical/electronic device mounted on the robot hand for operating the robot hand, and a hand attaching/detaching device, arranged between the robot arm and the robot hand, for detachably mounting the robot hand on the robot arm. A signal transmission path, is connected to an external robot controller at one end thereof and to the electrical/electronic device at the other end thereof, extends through the hand attaching/detaching device, and is able to be disconnected between the robot hand side and the robot arm side in the hand attaching/detaching device. The signal transmission path drives the robot hand, and allows a plurality of kinds of signals for the electrical/electronic device to pass therethrough in a multiplexed serial format; a first signal conversion circuit, arranged on a robot hand side, converts the multiplexed serial format signal into original parallel signals, and output the parallel signals to the electrical/electronic device, or converts signals from the electrical/electronic device into a multiplexed serial format signals, and outputs the multiplexed serial signal to a robot controller.

9 Claims, 21 Drawing Sheets

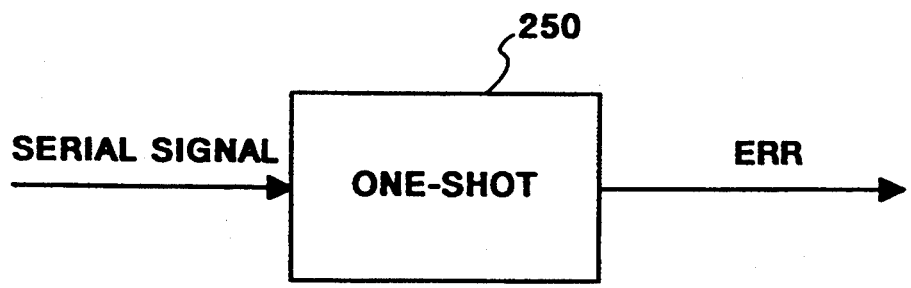
F I G. 13B
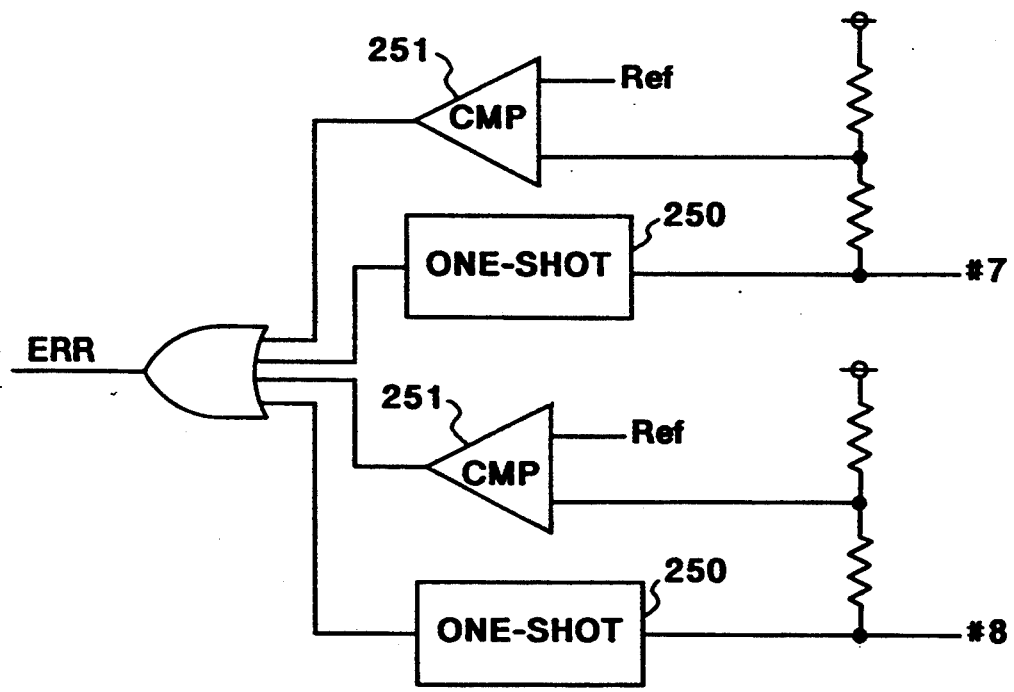
F I G. 13C

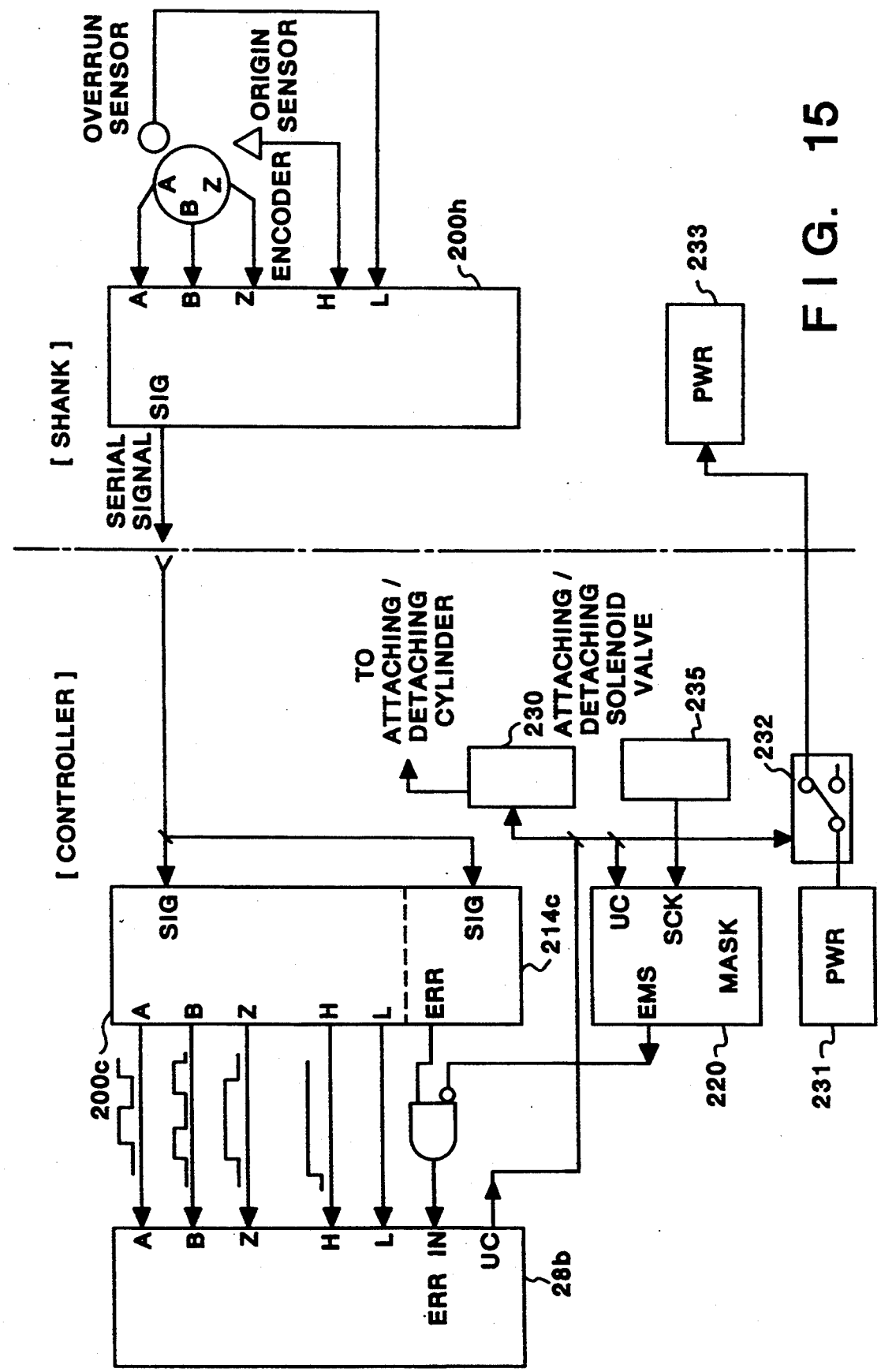
F I G. 15

ROBOT APPARATUS WITH AN ELECTRICAL DRIVER FOR CONTROLLING A DETACHABLE ROTOR HAND

This application is a continuation of application Ser. No. 07/644,610, filed Jan. 23, 1991, now abandoned.

BACKGROUND OF THE INVENTION

The present invention relates to a robot apparatus for transmitting a signal for a robot hand between a robot hand and an external robot controller to drive the hand and, more particularly, to a robot apparatus which can identify a state wherein the robot hand is separated from an arm, and a state wherein a failure occurs on a transmission path.

In general, when one robot is caused to perform various jobs, hands must be exchanged depending on jobs. For this reason, the distal end of an arm of the robot must have a hand attaching/detaching device for attaching/detaching the hands. The hand attaching/detaching device also requires a structure having a connection mechanism for supplying air and power to the hand, and for performing communication, and the like.

As a conventional hand attaching/detaching device as described above, Japanese Patent Laid-Open No. 58-186589 is known. In this reference, in order to reduce a shape in a Z-axis direction (a direction to disengage a hand), a locking ball is supported on a hand attaching/detaching device connected to a robot arm via an outward tapered surface so as to be reciprocal in a radial direction, and an inward tapered surface engaging with the locking ball is formed on the hand to be attached/detached.

In this prior art, the outward tapered surface is pressed downward to bring its cylindrical outer circumferential surface into contact with the locking ball, thereby causing the locking ball to project radially outwardly. The projecting locking ball is engaged with the inward tapered surface, thereby coupling the hand to the attaching/detaching mechanism. The cylindrical outer circumferential surface is pulled upward and is set so that the outward tapered surface is located aside the locking ball to permit a radial movement of the locking ball. Thus, an engagement between the inward tapered surface and the locking ball is released, and the hand can be detached from the attaching/detaching mechanism. As a result, in the conventional hand attaching/detaching device, when the hand is exchanged, an axial moving distance can be shortened, and a time required for an exchanging operation can also be shortened.

As described above, the hand attaching/detaching device is required to have a structure having a connection mechanism for supplying air and power to the hand, and for performing communication, and the like. However, in this connection mechanism, if the numbers of sensors and actuators to be arranged in the hand are to be increased, the number of contacts in an attaching/detaching portion between the hand and the attaching/detaching mechanism is increased. As a result, the weight of the robot arm distal end portion including the hand is undesirably increased, and the output of a motor for driving the robot must be increased.

In this connection mechanism, a disconnection state is always monitored. When the disconnection state is detected, a warning operation is executed as an abnormal state. However, in the hand attaching/detaching device, a hand detached state is similar to the disconnection state, and the disconnection state cannot be distinguished from the hand detached state.

The attaching/detaching mechanism between the robot and the hand requires a printed circuit board constituting an electrical circuit for sending signals to actuators such as motors for driving finger members of the hand, or supplying outputs from encoders for detecting a rotational speed and a rotational position of the motors of the hand to a control circuit in the robot. The conventional printed circuit board has a rectangular shape.

When a rectangular printed circuit board is assembled in the hand attaching/detaching mechanism, the following problems are posed.

That is, as shown in FIG. 20, when a printed circuit board A has a rectangular shape, a packing density of circuit parts mounted on the printed circuit board is undesirably decreased. More specifically, when the printed circuit board A is to be stored in a cylindrical proximal portion B of the hand, the printed circuit board A having a smaller area than a cylindrical storage area in the proximal portion B can only be stored, and a total of four dead spaces C are formed, as shown in FIG. 20. In this manner, it is difficult to increase a packing density on the printed circuit board A. As a result, when circuit parts are mounted on the printed circuit board A at a required packing density, a large number of printed circuit boards are required, resulting in a large and heavy apparatus.

SUMMARY OF THE INVENTION

The present invention has been made in consideration of the above situation, and has as its principal object to provide a robot apparatus which can decrease the number of signal transmission paths for connecting between a robot hand and a robot controller, and can decrease the weight of a robot arm distal end portion.

It is another object of the present invention to provide a robot apparatus which can distinctly distinguish a robot detached state from a failure such as a disconnection state, and can attain reliable failure detection without determining the hand detached state as a failure.

It is still another object of the present invention to provide a robot apparatus which can increase a packing density of a printed circuit board to be stored in a hand.

It is still another object of the present invention to provide a robot apparatus which can decrease the number of printed circuit boards to be stored in a hand as much as possible, thus attaining a compact and light-weight hand.

In order to achieve the principal object described above, a robot apparatus according to the present invention comprises: a robot arm; a robot hand; an electrical/electronic device mounted on the robot hand, and having a function associated with a driving operation of the robot hand; hand attaching/detaching means, arranged between the robot arm and the robot hand, for detachably mounting the robot hand on the robot arm; a signal transmission path, which is connected to an external robot controller at one end thereof and to the electrical/electronic device at the other end thereof, extends through the hand attaching/detaching means, and is able to be disconnected between the robot hand side and the robot arm side in the hand attaching/detaching means, for driving the robot hand, and allowing a plurality of kinds of signals for the electrical/electronic device to pass therethrough in a multiplexed serial format; and a first signal conversion circuit, arranged on the robot hand side, for converting the multiplexed serial format signal into original parallel signals, and outputting the parallel signals to the electrical/electronic device, or for converting signals from the electrical/electronic device into a multiplexed serial format signal, and outputting the multiplexed serial signal to the controller side.

In this manner, since signals passing through the hand attaching/detaching means for mechanically mounting the hand on the arm have at least a serial format, a plurality of signals are multiplexed. As a result, a structure around the hand can be rendered compact and light in weight.

In the robot apparatus according to the present invention, the external robot controller includes: a second signal conversion circuit for converting the multiplexed serial format signal supplied from the electrical/electronic device to the external robot controller into original parallel signals, or for converting signals from the external robot controller to the electrical/electronic device into a multiplexed serial format signal.

For this reason, serial communications can be performed not only in the attaching/detaching portion but also over a total length between the attaching/detaching portion and the controller, thus realizing a further lightweight and compact structure.

In order to achieve another object described above, in the robot apparatus according to the present invention, the hand attaching/detaching means includes: a holder fixed to the robot arm side; and a shank fixed to the robot hand side, end detachably mounted on the holder, and the shank being formed into a substantially cylindrical hollow shape. The first signal conversion circuit is arranged in the shank, and has a circuit board formed into a substantially disk shape to have an outer periphery adjacent to an inner circumferential surface of the shank.

When a disk-like printed circuit board is employed, a packing density of electrical parts on this circuit board can be increased.

In the robot apparatus according to the present invention, the signal transmission path comprises a plurality of connection terminals arranged on junction surfaces between the holder and the shank so that the connection terminals can be connected or disconnected in accordance with an attachment/detachment operation between the holder and the shank, and the connection terminals on the shank side are arranged on the same circumference to be located on the outer periphery of the substantially disk-shaped circuit board.

When the connection terminals are arranged in this manner, a lightweight and compact structure of the hand can be more easily attained.

In order to achieve still another object described above, a robot apparatus according to the present invention comprises: a robot arm; a robot hand; hand attaching/detaching means for detachably mounting the robot hand on the robot arm; driving means, arranged in the robot hand, for causing the robot hand to grip a work, and the like; a signal transmission path for allowing signals for electrically driving the driving means to pass therethrough, and for allowing signals from a sensor on the robot hand to pass therethrough, the signal transmission path extending through the hand attaching/detaching means, and being able to be disconnected between the robot hand side and the robot arm side in the hand attaching/detaching means; first detection means for, when the hand attaching/detaching means detaches the robot hand from the robot arm, detecting that the robot hand is actually separated from the robot arm; second detection means for detecting disconnection of the signal transmission path or an absence of signals on the signal transmission path; information means for informing a detection result by the second detection means to an external controller; and disabling means for, when the first detection means detects that the hand attaching/detaching means actually releases the robot hand, disabling the second detection means and/or the information means.

The disabling means actually monitors attachment/detachment of the hand, thereby distinctly distinguishing an absence of a serial signal due to a disengagement of the hand from a failure of a serial signal. Therefore, a failure display will never be erroneously made when a hand is disengaged. In other words, according to the present invention, reliable failure detection can be realized.

In the robot apparatus of the present invention, the robot hand comprises a power supply circuit for generating its own voltage based on a voltage supplied through the hand attaching/detaching means. When the robot hand is changed from a "detached" state to an "attached" state with respect to the robot arm, the disabling means adds a time required from when the first detection means detects the attached state of the robot hand until the power supply circuit is normally operated, and disables the second detection means and/or the information means. The disabling means includes: third detection means for detecting that the robot hand is changed from a "detached" state to an "attached" state with respect to the robot arm; timer means for measuring a predetermined time required from when the first detection means detects the attached state of the robot hand until the power supply circuit is normally operated in a state wherein the third detection means detects a change of the robot hand to the "attached" state; and release means for releasing a disabled state of the second detection means and/or the information means after an elapse of the predetermined time measured by the timer means.

As a result, according to the present invention, a transient state wherein a power supply is resumed will not be erroneously recognized as a failure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13B is a circuit diagram of a period monitoring circuit of a serial signal;

FIG. 13C is a detailed circuit diagram showing a circuit arrangement of a failure detection circuit 214c shown in FIG. 13A

FIG. 15 is a block diagram of a failure detection system;

DETAILED DESCRIPTION OF THE PREFERRED EMBODIMENT

Figure 1:
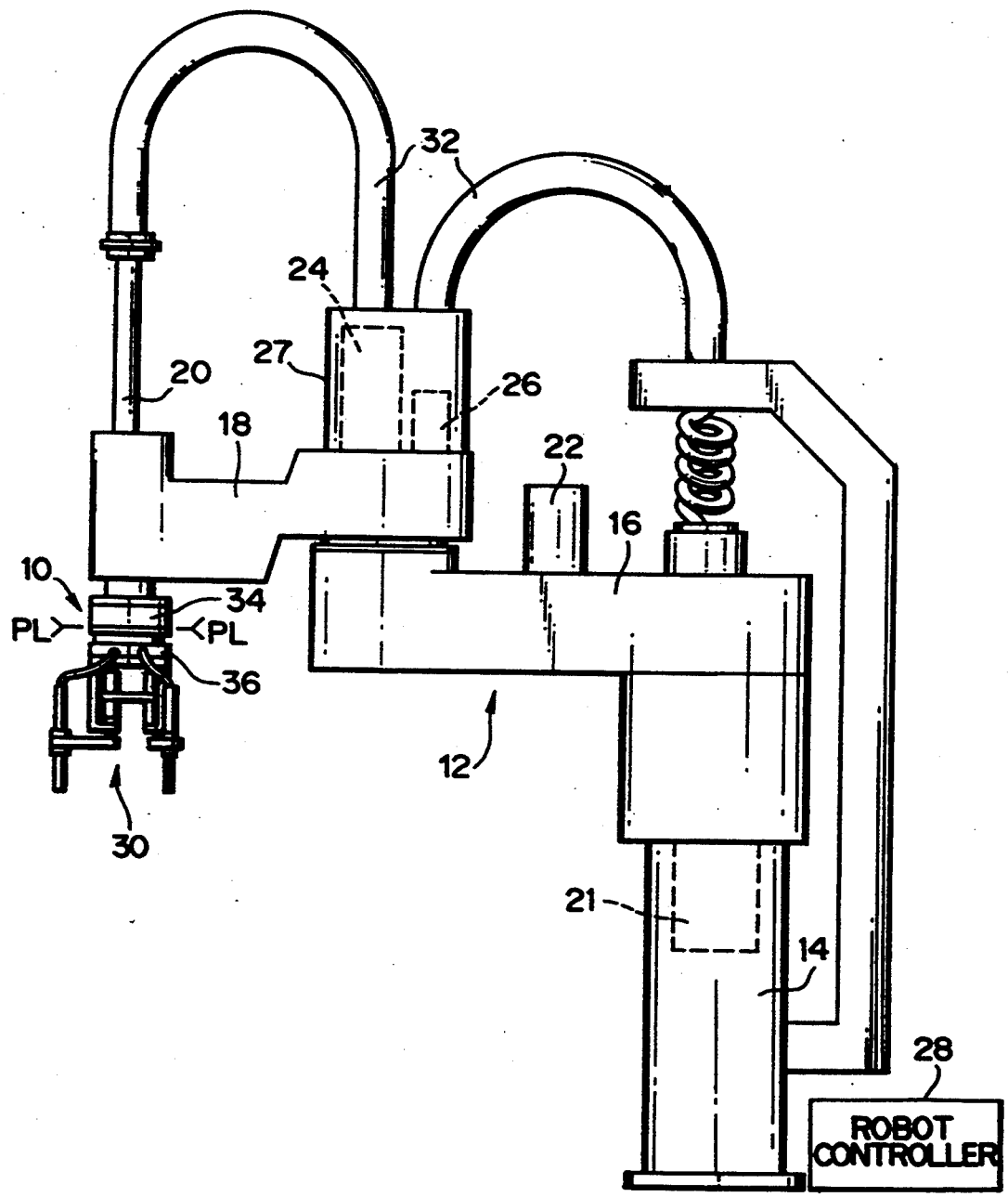
FIG. 1 is a schematic front view showing a structure of a robot to which an embodiment of a hand attaching/detaching mechanism according to the present invention is applied.

An arrangement of an embodiment wherein a robot apparatus according to the present invention is applied to a scaler type robot will be described in detail hereinafter with reference to the accompanying drawings.

<Robot System>

A schematic structure of a robot apparatus (automatic assembling apparatus) 12 which employs a hand attaching/detaching device or mechanism 10 of this embodiment will be described below with reference to FIG. 1.

The robot apparatus 12 is basically constituted by a column 14 fixed on a base (not shown), a first horizontal arm 16 supported on the upper end of the column 14 to be pivotal in a horizontal plane, a second horizontal arm 18 supported on the distal end of the first horizontal arm 16 to be pivotal in a horizontal plane, and a vertical arm 20 which is supported on the distal end of the second horizontal arm 18 to be vertically movable and to be pivotal about its own axis, and comprises a hollow cylinder. The hand attaching/detaching mechanism 10 as a characteristic feature of the present invention is mounted on the lower end of the vertical arm 20.

The first horizontal arm 16 is turned about the column 14 by a first driving motor 21 arranged in the column 14. The second horizontal arm 18 is turned about the distal end of the first horizontal arm 16 by a second driving motor 22 arranged in a substantially central portion of the upper surface of the first horizontal arm 16. The vertical arm 20 is moved in a vertical direction (Z-axis direction) and pivoted about its own axis by third and fourth driving motors 24 and 26 arranged on the proximal end portion of the upper surface of the second horizontal arm 18.

These first to fourth driving motors 21, 22, 24, and 26 are connected to a robot controller 28 via connecting lines (not shown) which extend through the interiors of the column 14 and the first horizontal arm 16. These driving motors 21, 22, 24, and 26 are rotated based on control commands from the robot controller so that a hand mechanism 30 mounted on the hand attaching/detaching mechanism 10 is moved to a predetermined position in a predetermined posture (pivot position).

The hand mechanism 30 is connected to the robot controller 28 and a pneumatic mechanism (not shown) via a connection cable 32, and is driven under the control of the robot controller 28 and the pneumatic mechanism. The connection cable 32 extends through the interior of the column 14, penetrates through the proximal end portion of the first horizontal arm 16, and temporarily appears outside the apparatus. The connection cable 32 is then flexed to form a large loop, and is then temporarily connected to a cover member 27 arranged on the proximal end portion of the second horizontal arm 18 to cover the third and fourth driving motors 24 and 26. Thereafter, the connection cable 32 externally extends from the cover member, and is inserted in the vertical arm 20 from the upper end thereof in a large loop state. The connection cable 32 extends through the interior of the vertical arm 20, and is connected to the hand mechanism 30 via the hand attaching/detaching mechanism 10.

The structure of the hand attaching/detaching mechanism 10 will be described in detail below with reference to FIGS. 2 to 9.

Holder

The robot attaching/detaching mechanism 10 is arranged to detachably mount the hand mechanism 30 on the lower end of the vertical arm 20 of the robot apparatus 12. The hand attaching/detaching mechanism 10 basically comprises a holder 34 fixed to the distal end of the vertical arm 20, and a shank 36 which can be desirably engaged/disengaged with/from the holder 34, and fixes the hand mechanism 30 at its lower portion, as shown in FIG. 2.

Figure 2:
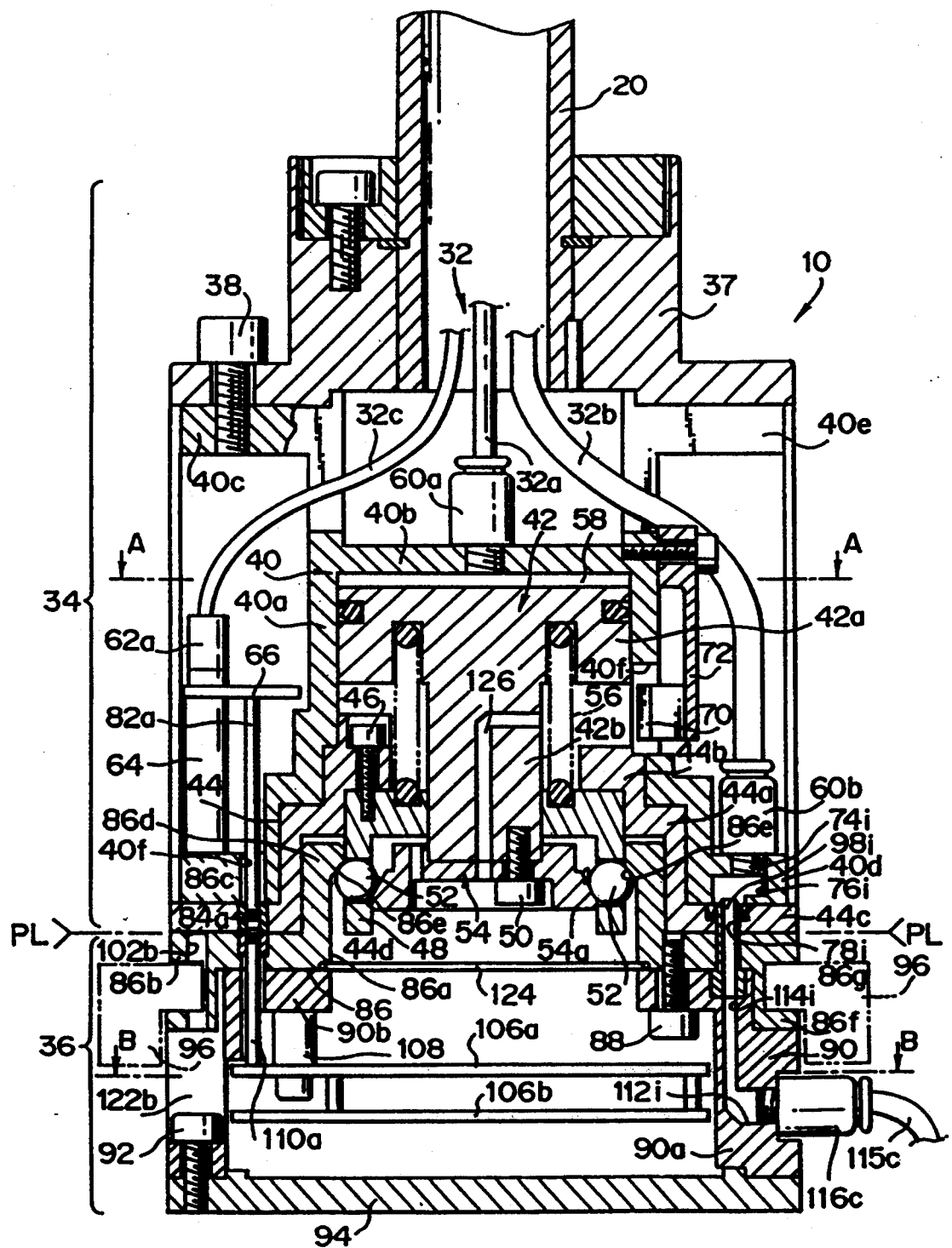
FIG. 2 is a longitudinal sectional view showing a coupled state of the hand attaching/detaching mechanism shown in FIG. 1.

As shown in FIG. 2, the holder 34 is schematically constituted by a fixing portion 37 fixed to the outer circumferential surface of the lower end of the vertical arm 20, a cylinder portion 40 mounted on the lower surface of the fixing portion 37 via a bolt 38, a piston 42 which is vertically slidably stored in the cylinder portion 40, an inner cylinder 44 integrally fitted in the lower end face and the inner circumferential surface of the lower part of the cylinder portion 40, a ball support cylinder 48 fixed inside the piston 42 via a bolt 46, a locking member 54 fixed to the lower end of the piston 42 via a bolt 50 and formed with an outward tapered surface 54a on its outer circumferential surface, which tapered surface is engaged from below with inward lower portions of a plurality of balls 52 supported on the ball support cylinder 48, and a coil spring 56, interposed between the ball support cylinder 48 and the piston 42, for always biasing the piston 42 upward.

Figure 3:
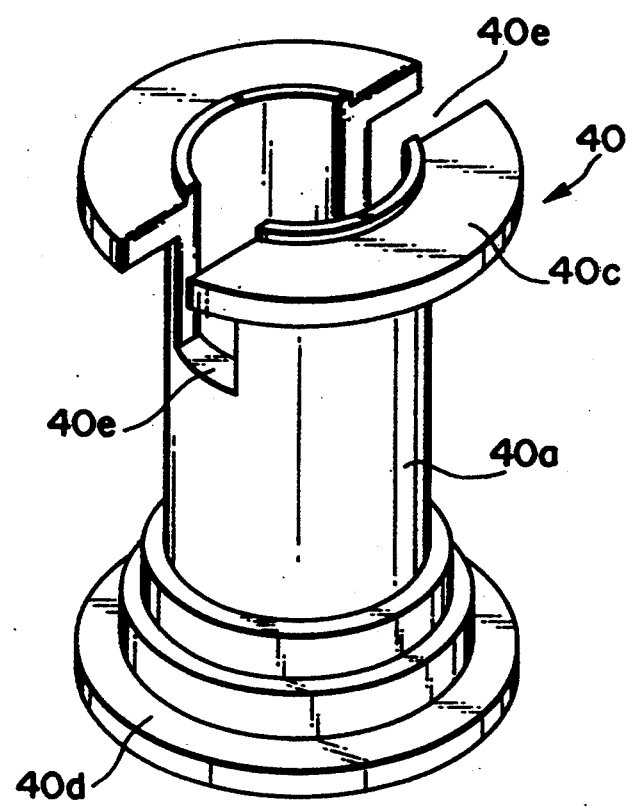
FIG. 3 is a perspective view of a cylinder body.

As shown in FIG. 3, the cylinder portion 40 is integrally formed by a cylinder main body 40a formed into a substantially hollow cylindrical shape having upper and lower open ends, a partition wall 40b (FIG. 2) for vertically partitioning an internal space of the cylinder main body 40a, first outward flange portions 40c formed on the outer circumferential surface of the upper end of the cylinder main body 40a, and a second outward flange portion 40d formed on the outer circumferential surface of the lower end of the cylinder main body 40a.

Wide slits 40e are formed to extend vertically along the central line on a portion above the partition wall 40b of the cylinder main body 40a including the first outward flange portions 40c. Since the slits 40e are formed in this manner, the connection cable 32 extending through the interior of the vertical arm 20 extends from the lower end opening of the vertical arm 20 into the internal space of the cylinder portion 40 above the partition wall 40b, as shown in FIG. 2, and can extend therefrom outside the cylinder portion 40 via the slits 40e.

As shown in FIG. 2, the connection cable 32 is constituted by a first air hose 32a for introducing compressed air into a cylinder chamber 58 (to be described later), nine second air hoses 32b (only one hose is illustrated for the sake of simplicity for supplying compressed air to the hand mechanism 30, and cables 32c for electrically connecting the hand mechanism 30 and the robot controller 28. The first air hose 32a is connected to the central portion of the partition wall. 40b via a first connection port 60a. The nine second air hoses 32b are connected to the upper surface of the second outward flange portion 40d via second connection ports 60b. Each cable 32c is electrically connected to a relay circuit board 66 mounted on the second outward flange portion 40d via a stay 64 through a first connector 62a connected to the distal end of the cable 32c.

The above-mentioned cylinder chamber 58 is defined by a space enclosed by the lower surface of the partition wall 40b, the upper surface of the piston 42, and the inner circumferential surface of the cylinder main body 40a. The piston 42 is integrally formed by a piston main body 42a which is in sliding contact with the inner circumferential surface of the cylinder main body 40a, and a solid-columnar projecting portion 42b which projects downward from the central portion of the lower surface of the piston main body 42a.

The piston 42 with the above structure is elastically held at an uppermost position where it abuts against a stopper (not shown) by the biasing force of the coil spring 56 when no compressed air is introduced into the cylinder chamber 58. When compressed air is introduced into the cylinder chamber 58 via the first connection port 60a, the piston 42 is pushed downward against the biasing force of the coil spring 56. When the piston 42 is brought into contact with the upper end of the above-mentioned inner cylinder 44, it is elastically held at a lowermost position.

The above-mentioned inner cylinder 44 is integrally formed by a hollow, substantially cylindrical inner cylinder main body 44a which is fitted in the inner circumferential surface of the lower portion of the cylinder main body 40a, and has upper and lower open ends, an inward flange portion 44b formed on the upper end of the inner cylinder main body 44a, and an outward flange portion 44c which is formed on the lower end of the inner cylinder main body 44a, and is in contact with the lower surface of the second outward flange portion 40d. The lower surface of the outward flange portion 44c defines an upper side of an attaching/detaching plane PL. More specifically, the above-mentioned shank 36 is defined in a portion below the lower surface of the outward flange portion 44c.

Figure 4:
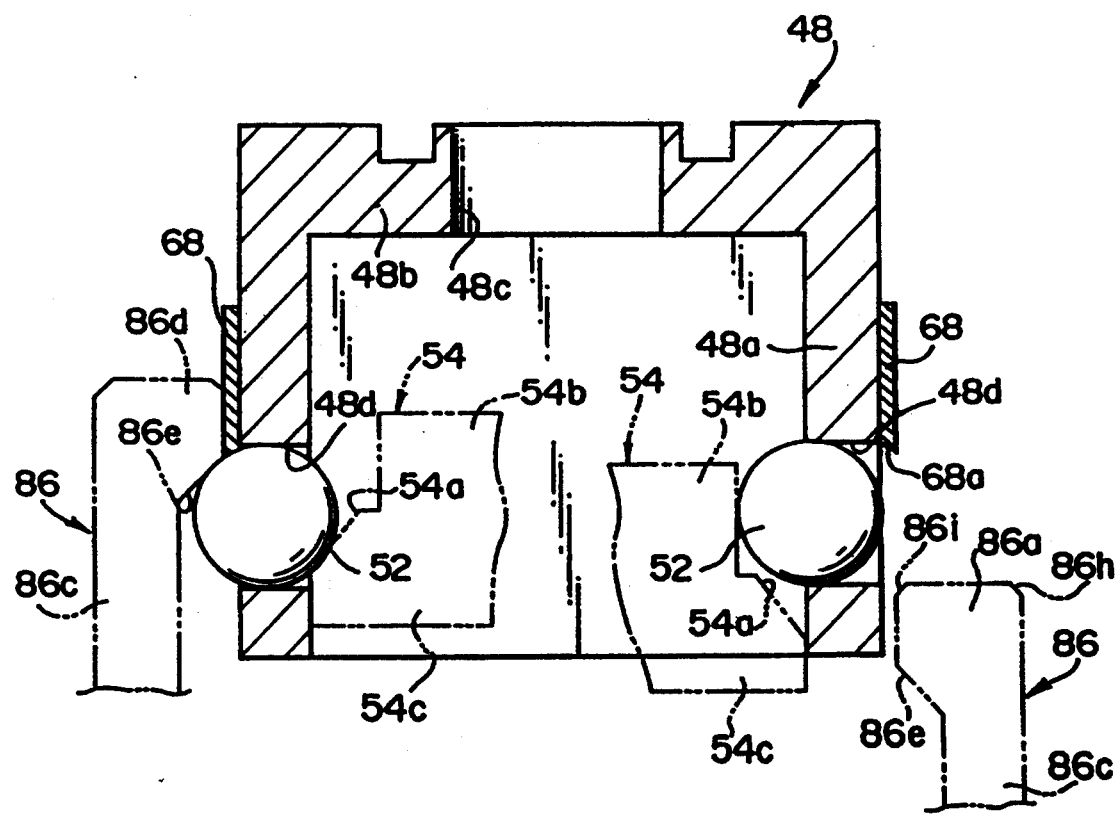
FIG. 4 is a longitudinal sectional view of a ball support cylinder.

The above-mentioned ball support cylinder 48 is formed into a cylindrical shape having a lower open surface. More specifically, as shown in FIG. 4, the cylinder 48 is integrally formed by a hollow cylindrical support cylinder main body 48a which is fitted in the upper portion of the inner cylinder main body 44a, and a ceiling portion 48b formed to cover the upper surface of the support cylinder main body 48a. A through hole 48c in which the projecting portion 42b of the above-mentioned piston 42 is vertically movably inserted is formed in the central portion of the ceiling portion 48b. The thickness of the support cylinder main body 48a is set to be smaller than the diameter of each ball 52 supported thereon.

A plurality of (six in this embodiment) ball support holes 48d are formed along the circumferential direction at equal angular intervals in the support cylinder main body 48a of the ball support cylinder 48 to extend in a direction of thickness. Each ball support hole 48d is formed into a circular shape; having a diameter slightly larger than that of the ball 52 when it is viewed from a front side, so that the ball 52 can be movably inserted therein. More specifically, at least one side (inner side and/or outer side) of each ball 52 projects from the corresponding ball support hole 48d.

A locking sleeve 68 is fitted on the outer circumferential surface of the support cylinder main body 48a to prevent the balls 52 from radially outwardly dropping from the corresponding ball support holes 48d. The locking sleeve 68 is aligned and fixed, so that its lower end projects slightly downward from the upper edge of each ball support hole 48d to constitute a locking pawl. More specifically, a tapered surface 68a which is tapered downward radially outwardly is formed on the lower end of the locking sleeve 68. The tapered surface 68a projects above the corresponding ball support holes 48d. In this manner, each ball 52 is locked by the tapered surface 68a of the locking sleeve 68, and can be prevented from radially outwardly dropping from the corresponding ball support hole 48d.

Referring back to FIG. 2, the above-mentioned locking member 54 is constituted by a substantially disk-like main body portion 54b fixed to the lower end of the projecting portion 42b which projects into the internal space of the ball support cylinder 48 via the through hole 48c, and an outward flange portion 54c formed on the lower end of the main body portion 54b, and having an outer circumferential surface which is in sliding contact with the inner circumferential surface of the support cylinder main body 48a. The abovementioned outward tapered surface 54a is defined between the upper edge of the outward flange portion 54c and the lower edge of the main body portion 54b. The outward tapered surface 54a has a slope so that its lower portion has a larger diameter.

A gap between the inner circumferential surface of the support cylinder main body 48a of the ball support cylinder 48 and the outer circumferential surface of the main body portion 54b of the locking member 54 is set to be large enough to prevent the balls 52 from being disengaged inwardly. In this manner, these balls 52 are supported in the ball support holes 48d of the ball support cylinder 48 so as to be prevented from being disengaged outwardly and inwardly. In particular, the diameter of the outer circumferential surface of the main body portion 54b is set to be large enough to completely retract the radially outward edge of each ball 52 in the corresponding ball support hole 48d when the ball is displaced radially inwardly, as indicated by an alternate long and two short dashed line in FIG. 4. When the piston 42 is moved upward to the uppermost position, the outward tapered surface 54a is in contact with inward portions of the corresponding balls 52, as indicated by an alternate long and short dashed line in FIG. 4, and displaces these balls 52 radially outwardly, so that their outward portions project outwardly from the outer circumferential surface of the support cylinder main body 48a. When the piston 42 is pushed downward to its lowermost position, the outward tapered surface 54a is disengaged from the inward portions of the corresponding balls 52, and permits radially inward movements of these balls 52, so that their outward portions do not project from the outer circumferential surface of the support cylinder main body 48a.

Figure 5:
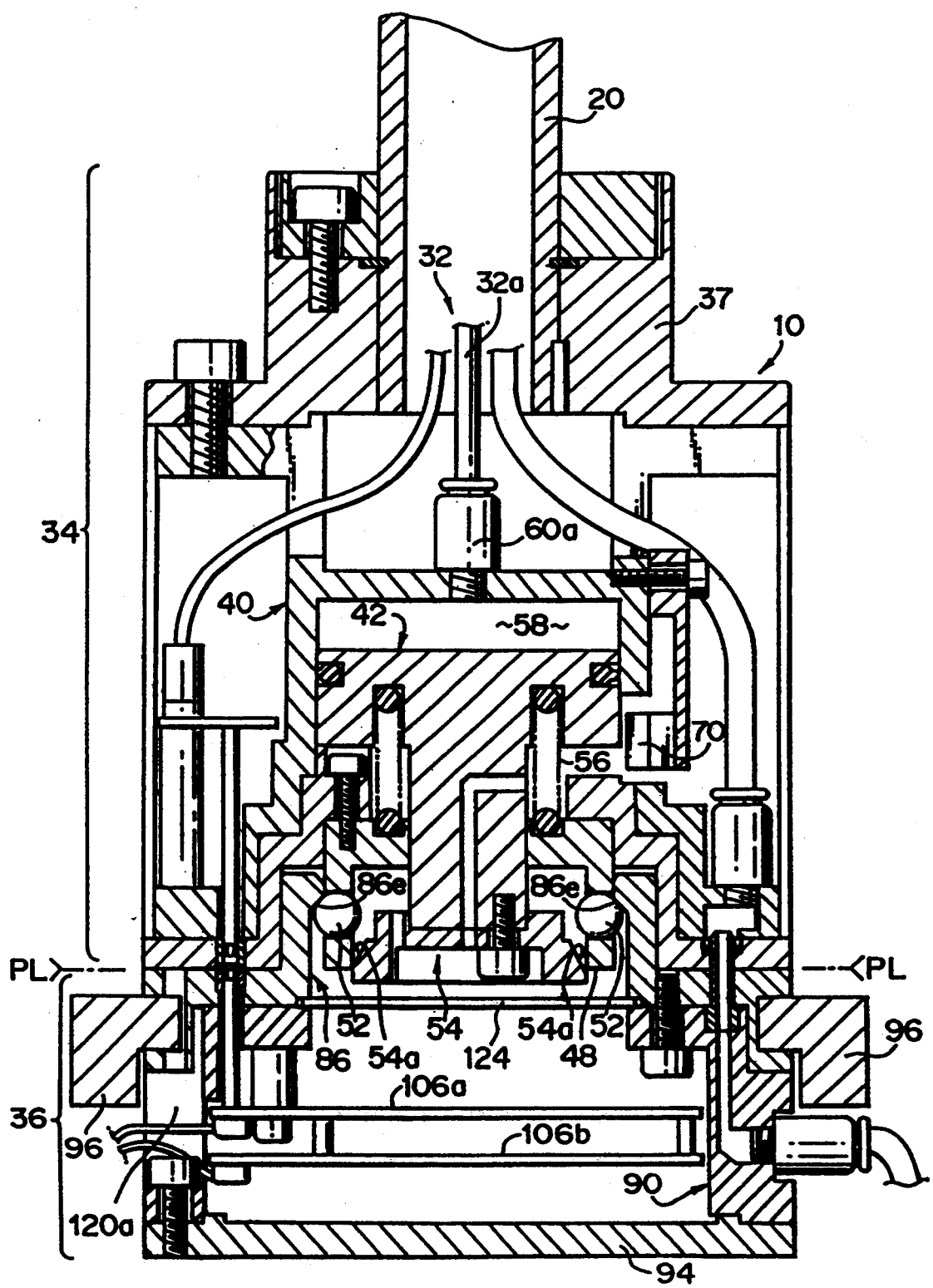
FIG. 5 is a longitudinal sectional view showing the hand attaching/detaching mechanism in a state wherein a release state of a holder is defined.

As shown in FIG. 5, when the piston 42 is moved downward to its lowermost position, an open state of this hand attaching/detaching mechanism 10 is defined. In order to detect the lowermost position of the piston 42, an opening 40f is formed midway along the cylinder main body 40a of the above-mentioned cylinder portion 40 and at a position facing the lower end of the piston main body 42a at the lowermost position. A lowermost position sensor 70 is arranged in the opening 40f and is mounted on the cylinder main body 40a via a stay 72. The lowermost position sensor 70 is turned on by the piston main body 42a which is moved downward to its lowermost position, and is turned off when the piston main body 42a is located at a position other than the lowermost position.

Attaching/detaching Portion

Figure 6A:
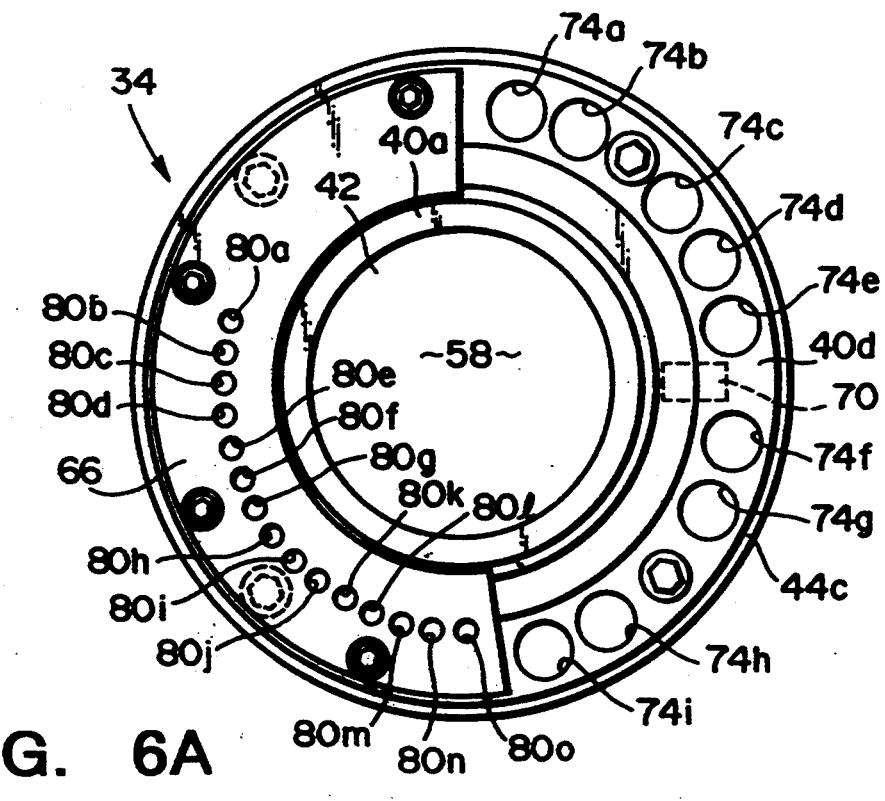
FIG. 6A is a cross-sectional view of the hand attaching/detaching mechanism taken along a line A—A in FIG. 2.

As shown in FIG. 6A, a total of nine connection holes 74a to 74i are formed in the upper surface of the second outward flange portion 40d of the cylinder portion 40, i.e., on a substantially right half portion in FIG. 6A. The second connection ports 60b are respectively connected to these connection holes 74a to 74i. More specifically, in this embodiment, the nine second connection ports 60b are arranged in correspondence with the nine second air hoses 32b. For the sake of illustrative convenience, FIG. 6A illustrates a state wherein the second connection ports 60b are connected to the first, fifth, and ninth connection holes 74a, 74e, and 74i.

Note that although only the ninth connection hole 74i is illustrated in FIG. 2 at this sectional position for the sake of illustrative convenience, communication chambers 76a to 76i are open to the lower surface of the second outward flange portion 40d to communicate with the connection holes 74a to 74i, respectively. The communication chambers 76a to 76i are formed in an elongated shape to extend radially inwardly from communication positions with the corresponding connection holes 74a to 74i.

The communication chambers 76a to 76i are closed by the outward flange portion 44c of the inner cylinder 44 mounted on the lower surface of the second outward flange portion 40d of the cylinder portion 40. Nine connection pipe insertion holes 78a to 78i for respectively receiving connection pipes 98a to 98i (to be described later) extend in the outward flange portion 44c in a direction of thickness to be open to the radially inward portions of the corresponding communication chambers 76a to 76i. In other words, the connection holes 74a to 74i and the connection pipe insertion holes 78a to 78i which communicate with each other via the corresponding communication chambers 76a to 76i are alternately arranged in the radial direction, so that the latter holes are located inwardly from the former ones.

With this structure, a locking groove for locking a finger rack (to be described later) can be formed in a portion of the shank main body located radially outwardly from the radially inwardly offset connection pipe insertion holes 78a to 78i without increasing the overall outer dimensions of the attaching/detaching mechanism 10.

Referring again to FIG. 6A, a plurality of (15 in this embodiment) connection pins 80a to 80o are fixed to stand upright on the above-mentioned relay circuit board 66. The connection pins 80a to 80o are mounted while the first connector 62a is connected.

As the characteristic feature of the present invention, the number of these connection pins 80a to 80o, i.e., "15" is determined since each cable 32c is constituted as a serial interface cable, and communications are made between the robot controller 28 and the hand mechanism 30 through this cable, as will be described later. In other words, in a conventional system, the robot controller and the hand mechanism are connected to each other through a parallel interface cable. As a result, the number of connection pins is increased to 32 under the same condition.

However, according to the present invention, since the serial interface cable is adopted, the number of connection pins 80a to 80o can be decreased to "15". As a result, the area of the relay circuit board 66 can be decreased, and the number of first connectors 62a can be decreased. Therefore, the overall attaching/detaching mechanism 10 can be rendered compact, and its weight can be decreased.

The connection pins 80a to 80o are electrically connected to connection bushings 84a to 84o formed on the lower surface of the outward flange portion 44c of the inner cylinder 44 via the connection rods 82a to 82o, respectively. More specifically, vertical through holes 44d for storing the connection bushings 84a to 84o are formed in the outward flange portion 44c. Connection terminals (to be described later) are respectively inserted in the internal spaces of the connection bushings 84a to 84o, and are electrically connected thereto.

The connection rods 82a to 82o are respectively fitted on and electrically connected to the upper portions of the corresponding connection bushings 84a to 84o via vertical through holes 40f formed in the second outward flange portion 40d. In this manner, the connection pins 80a to 80o and the connection bushings 84a to 84o are electrically connected to each other.

The holder 34 defining one constituting element of the hand attaching/detaching mechanism 10 has been described. The shank 36 which defines the other constituting element of the hand attaching/detaching mechanism 10 will be described below.

Shank

The shank 36 has a structure common to various hand mechanisms detachably mounted on the vertical arm 20 of the robot apparatus 12 via the hand attaching-/detaching mechanism 10. More specifically, as shown in FIG. 2, the shank 36 is mainly constituted by a shank main body 86 having an upper surface for defining a lower side of the attaching/detaching plane PL, a coupling cylinder 90 fixed to the lower portion of the shank main body 86 via a bolt 88, and a mounting plate 94 fixed to the lower surface of the coupling cylinder 90 via bolts 92.

The shank main body 86 comprises a disk-like attaching/detaching member 86b in which a circular through hole 86a for receiving the ball support cylinder 48 of the holder 34 is formed at its central portion. A cylindrical locking cylindrical portion 86c is integrally formed on the upper surface of an attaching/detaching member 86b to surround the through hole 86a and to stand upright from this opening peripheral edge. An inward flange portion 86d is formed on the upper end of the locking cylindrical portion 86c, and an inward tapered surface 86e capable of being hooked on the outward upper portions of the balls 52 supported on the above-mentioned ball support cylinder 48 is formed on the inner surface of the inward flange portion 86d.

The inward tapered surface 86e has a slope, so that its diameter is increased toward an upper portion. The inner circumferential surface of the inward flange portion 86d opposes the outer circumferential surface of the above-mentioned locking sleeve 68 at a small interval.

A downward extending portion 86f having a predetermined thickness is integrally formed on the lower surface of the outer peripheral portion of the attaching-/detaching member 86b of the shank main body 86 over the entire periphery. A locking groove 86g to be locked with a hand base 96 (FIG. 7) is formed on the outer circumferential surface of the downward extending portion 86f over the entire periphery.

Figure 7:
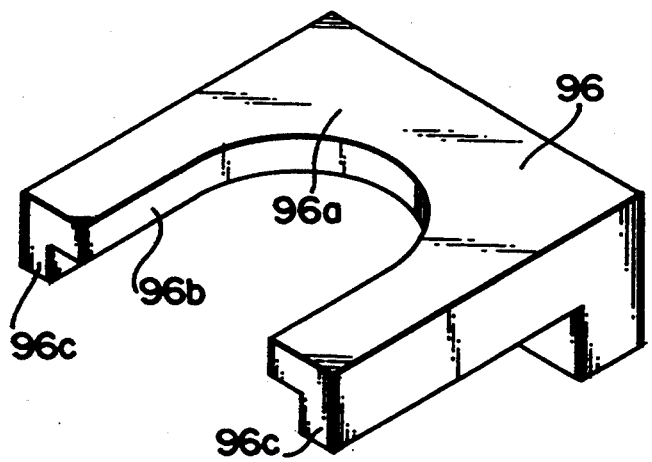
FIG. 7 is a perspective view showing a structure of a shank rack.

As shown in FIG. 7, a plurality of hand bases 96 are arranged on a hand exchange station (not shown), and have the same shape. As shown in FIG. 7, the hand base 96 comprises a planar rack main body 96a having a thickness enough to be fitted in the locking groove 86g of each shank 36. A recess portion 96b for receiving the shank 36 is formed in the front end face of the rack main body 96a. Reinforcement ribs 96c are integrally formed on the lower surfaces of the two side edges of the rack main body 96a. As a result, when the hand base 96 is viewed from a front side, the two edge portions have opposing inverted L shapes.

In other words, in this embodiment, the entire hand base 96 is formed by a thin plate to have a thickness large enough to be fitted in the locking groove 86g, and a pair of reinforcement ribs 96c are integrally mounted on the base, thus guaranteeing a mechanical strength of the base. In this manner, since the mechanical strength of the hand base 96 can be guaranteed, the height position of the shank 36 hooked on the hand base 96, more particularly, the height position of the upper surface of the shank main body 86 can be kept constant while the hand mechanism 30 is coupled to its lower portion.

In the shank main body 86 with this structure, as shown in the enlarged view of FIG. 4, an outward tapered surface 86h is formed on the outer peripheral edge of the upper surface of the inward flange portion 86d over the entire periphery. Since the outward tapered surface 86h is formed in this manner, the inward flange portion 86d of the shank main body 86 of the shank 36 hooked on the hand base 96 can be easily inserted in slidable contact with the inner circumferential surface of the inner cylinder main body 44a of the inner cylinder 44 when the holder 34 is moved downward from the above. In other words, when the outward tapered surface 86h of the inward flange portion 86d of the shank main body 86 is engaged with the lower edge of the inner circumferential surface of the inner cylinder main body 44a of the inner cylinder 44, even if the central axes of the holder 34 and the shank 36 are slightly offset from each other, their relative positions are changed, and their central axes can be precisely matched. As a result, the shank main body 86 can be reliably guided to be fitted in the inner cylinder 44.

An insertion inward tapered surface 86i is formed on the inner peripheral edge of the upper surface of the inward flange portion 86d over the entire periphery. Since the inward tapered surface 86i is formed in this manner, after the shank main body 86 is fitted in the inner cylinder 44, the inner circumferential surface of the inward flange portion 86d of the shank main body 86 can be satisfactorily slidably fitted on the outer circumferential surface of the locking sleeve 68 when the holder 34 is further moved downward.

Figure 6B:
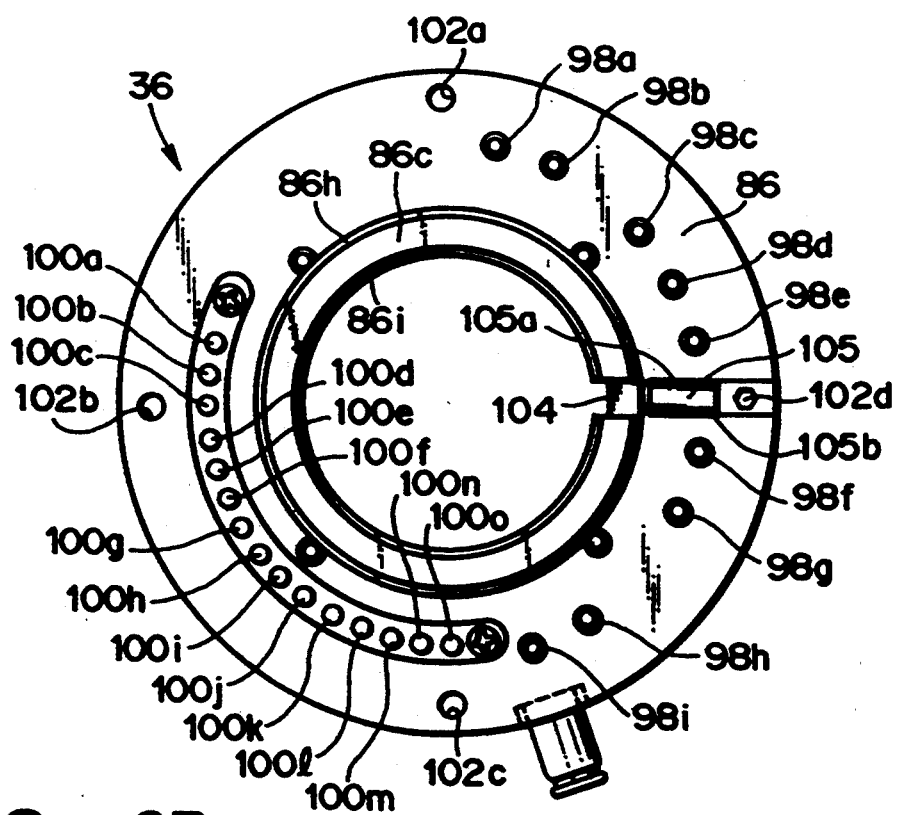
FIG. 6B is a plan view showing an upper surface structure of a shank main body of the hand attaching/detaching mechanism.

Connection pipes 98a to 98i are arranged on the upper surface of the shank main body 86 at positions corresponding to the connection pipe insertion holes 78a to 78i to project upward to be able to be inserted in the corresponding holes from below, as shown in FIG. 6B. When the holder 34 is moved downward and is coupled to the shank 36, i.e., when the lower surface of the outward flange portion 44c of the inner cylinder 44 is in contact with the upper surface of the attaching-/detaching member 86b of the shank main body 86, the upper ends of the connection pipes 98a to 98i are inserted in the communication chambers 76a to 76i via the corresponding connection pipe insertion holes 78a to 78i.

Connection terminals 100a to 100o are arranged on the upper surface of the shank main body 86 at positions corresponding to the above-mentioned connection bushings 84a to 84o to be able to be inserted therein from below, as shown in FIG. 6B. When the holder 34 is moved downward and is coupled to the shank 36, the upper ends of the connection terminals 100a to 100o are respectively inserted in the corresponding connection bushings 84a to 84o, and are electrically connected thereto.

Four through holes 102a to 102d used for pivoting the bolts 92 from the above to fix the mounting plate 94 to the coupling cylinder 90 are formed in the upper surface of the shank main body 86 at equal angular intervals along the circumferential direction to extend in the direction of thickness, as shown in FIG. 6B. Note that these through holes 102a to 102d are formed to be offset radially outwardly so as to avoid contention with the above-mentioned connection pipes 98a to 98i and the connection terminals 100a to 100o.

Figure 8:
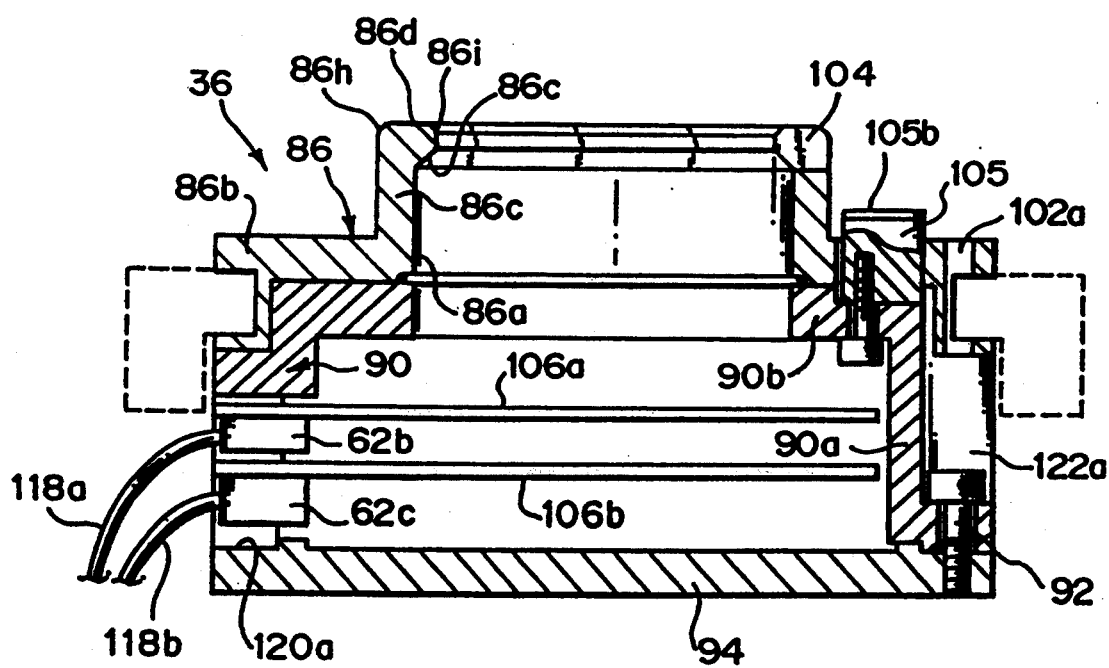
FIG. 8 is a front sectional view showing a formation state of a measurement slit formed in the shank main body.

As shown in FIGS. 6B and 8, a measurement slit 104 is formed in the upper surface of the inner flange portion 86c of the shank main body 86 to extend downward. As can be seen from FIG. 8, the lower end of the slit 104 is terminated at a position immediately below the lower edge of the hooking inward tapered surface 86e. Since the slit 104 is formed in this manner, when the hooking inward tapered surface 86e is formed by mechanical working, the tapered surface can be worked while observing it through this slit 104. More specifically, the hooking inward tapered surface 86e can be formed while detecting a working position using a detection device utilizing, e.g., visual observation through this slit 104.

As a result, the shape and size of the hooking inward tapered surface 86e can be precisely defined. When the tapered surface 86e is precisely aligned in this manner, as shown in FIG. 2, the six balls 52 can be clamped between itself and the outward tapered surface 54a. Therefore, according to this embodiment, when the coupled state is defined in the hand attaching/detaching mechanism 10, the lower surface of the outward flange portion 44c of the inner cylinder 44 in the holder 34 and the upper surface of the shank main body 86 in the shank 36 are in tight contact with each other in the attaching/detaching plane PL, and a good coupled state free from cluttering can be attained.

As shown in FIG. 8, a rotational positioning member 105 for positioning the shank 36 and the holder 34 coupled thereto in a rotational direction projects upward from a portion of the upper surface of the attaching-/detaching member 86b of the shank 36. Although not shown, a recess portion corresponding to the rotational positioning member 105 is formed in the bottom surface of the outward flange portion 44c. As can be apparent from FIG. 6B, the rotational positioning member 105 is formed into a rectangular prism shape, and a pair of opposing surfaces of the rectangular prism are set as surfaces perpendicular to the circumferential direction to define a rotational position, and so-called C-cut tapered surfaces 105a and 105b are formed at the upper edges of the pair of these position regulating surfaces.

Since the rotational positioning member 105 is formed not by a column but by a rectangular prism, positioning can be attained by surface contact. As a result, when the positioning operation is repeated and the position regulating surfaces are locally worn, since the position can be regulated by surface contact, the remaining non-worn portions can be in surface contact with each other to regulate the position. In this manner, a rotational positioning effect can be reliably provided.

Printed Circuit Board For Electrical Circuit

Figure 6C:
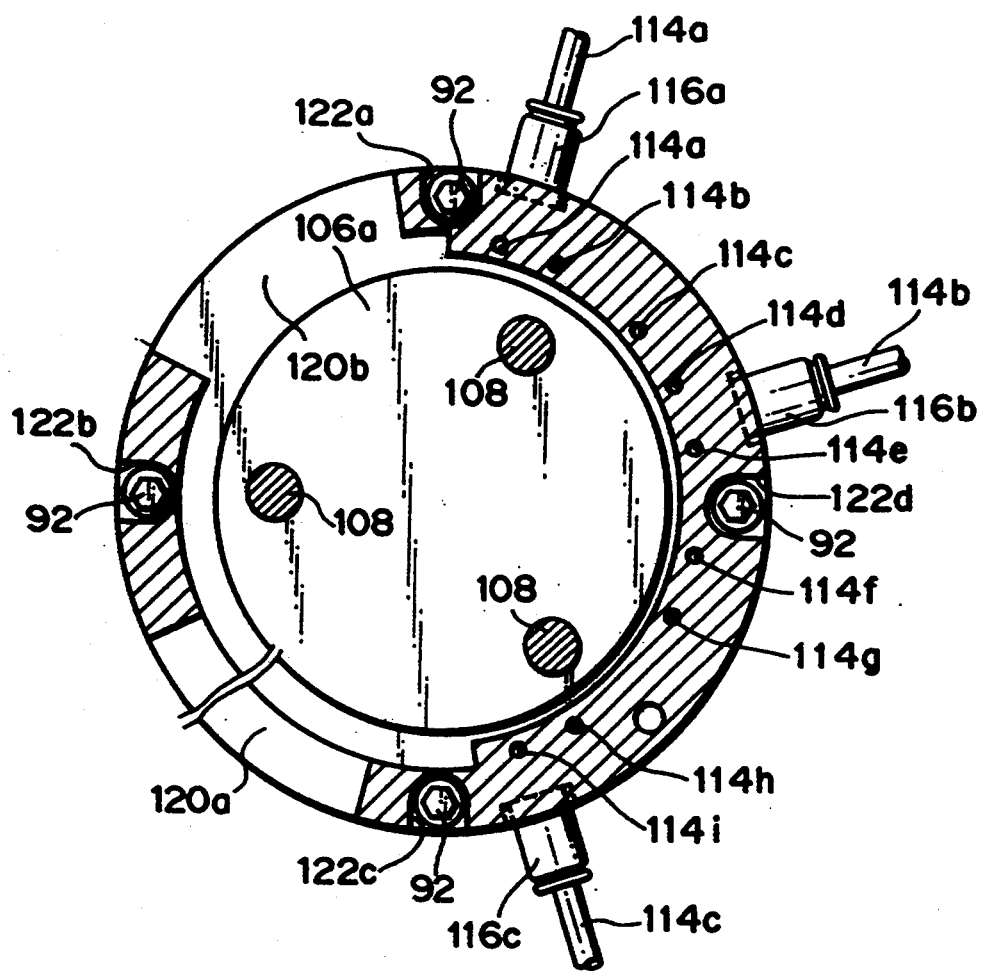
FIG. 6C is a cross-sectional view of the hand attaching/detaching mechanism taken along a line B—B in FIG. 2.

The coupling cylinder 90 constituting the shank 36 is integrally formed by a main body portion 90a formed into a cylindrical shape having upper and lower openings, and an inward flange portion 90b formed on the upper end of the main body portion 90a. A pair of upper and lower circuit boards 106a and 106b are arranged in the coupling cylinder 90 to be suspended from the lower surface of the inward flange portion 90b via a spacer 108. As shown in FIG. 6C, these circuit boards 106a and 106b are formed into a flat disk shape so that their outer peripheral edges are located adjacent to the entire inner peripheral edge of the coupling cylinder 90. In this manner, since the two circuit boards 106a and 106b are formed into a flat disk shape, the arrangement areas of the circuit boards 106a and 106b in the coupling cylinder 90 can be maximized (i.e., a dead space can be eliminated as much as possible). In this manner, packing efficiency of electronic parts onto these circuit boards 106a and 106b can be improved.

The upper circuit board 106a and the above-mentioned connection terminals 100a to 100o are electrically connected to each other via connection rods 110a to 110o which vertically extend through the attaching-/detaching member 86b of the shank main body 86 and the inward flange portion 90b of the coupling cylinder 90. Note that the upper and lower circuit boards 106a and 106b are electrically connected to each other through a connection board (not shown).

Nine connection port connection holes 112a to 112i are open to the outer circumferential surface of the main body portion 90a of the coupling cylinder 90 in correspondence with the nine connection pipes 98a to 98i described above. The connection holes 112a to 112i communicate with the connection pipes 98a to 98i via coupling paths 114a to 114i which vertically extend through the attaching/detaching member 86b of the shank main body 86 and the inward flange portion 90b of the coupling cylinder 90.

Of the nine connection holes 112a to 112i, three connection hoses 115a, 115b, and 115c are respectively connected to the connection holes 112a, 112e, and 112i corresponding to the first, fifth, and ninth bushings 84a, 84e, and 84i through connection ports 116a, 116b, and 116c, as shown in FIG. 6C. These three connection hoses 115a to 115c extend to the hand mechanism 30.

Circuits for converting a serial signal supplied from the robot controller 28 into a parallel signal or converting a parallel signal to be sent to the robot controller 28 into a serial signal are formed on the pair of upper and lower circuit boards 106a and 106b, as shown in FIG. 2. Signals from the two circuit boards 106a and 106b are connected to the hand mechanism 30 via first and second connection line groups 118a and 118b having the second and third connectors 62a and 62c at their one-end sides, as shown in FIG. 8.

In order to temporarily extract these first and second connection line groups 118a and 118b outside the coupling cylinder 90, as shown in FIG. 6C, a pair of openings 120a and 120b are formed in a peripheral wall constituting the main body portion 90a to extend in the direction of thickness. When the openings 120a and 120b are formed in this manner, the first and second connection line groups 118a and 118b are extracted outside the shank 36 via these openings 120a and 120b, and are then connected to the hand mechanism 30.

A total of four bolts 92 are arranged. In order to mount these four bolts 92, four recess portions 122a to 122d are formed on the outer circumferential surface of the main body portion 90a of the coupling cylinder 90 at positions immediately below the above-mentioned through holes 92a and 92d to communicate with these through holes. The height of each of the recess portions 122a to 122d is set to be slightly larger than the height of each bolt 92. With this structure, the bolts 92 are temporarily stored in the corresponding recess portions 122a to 122d from a sideward direction, and are then rotated by a screwdriver (not shown) inserted through the corresponding through holes 102a to 102d from the above so as to be threadably engaged with the mounting plate 94. In this manner, the mounting plate 94 can be fixed to the coupling cylinder 90.

Dust-proof Partitioning Plate

As shown in FIG. 2, the internal space of the shank 36 is partitioned into upper and lower spaces by a partitioning plate 124 claimed between the shank main body 86 and the coupling cylinder 90. With this partitioning plate 124, when the shank 36 is disengaged from the holder 34 and is held on the hand base 96, i.e., when the shank 36 is externally exposed, the circuit boards 106a and 106b can be located in a closed space. In this manner, the partitioning plate 124 can attain a dust-proof effect of these circuit boards 106a and 106b.

Since the partitioning plate 124 is arranged, when the shank 36 is coupled to the holder 34, as can be seen from FIG. 2, the volume of a space where the lower portion of the piston 42 is located, i.e., a space enclosed by the partitioning plate 124, the shank main body 86, and the ball support cylinder 48 is limited to be small. When the piston is moved downward during an attaching/detaching operation (to be described later), if the above-mentioned space is closed, the lower portion of the piston 42 projects into this closed space, and air in this closed space is compressed, thus exhibiting a so-called elastic effect. As a result, the compressed air serves as a counterforce against the downward movement of the piston 42.

In this embodiment, however, in order to achieve the smooth downward movement of the piston 42 while preventing generation of an unnecessary counterforce against the downward movement of the piston 42, a communication hole 126 is formed to extend through the piston main body 42a of the piston 42 and the main body portion 54b of the locking member 54. The upper end of this communication hole 126 is open to the outer peripheral surface of the piston main body 42a which is always located above the ball support cylinder 48, and its lower end is open to the lower surface of the main body portion 54b of the locking member 54.

Since the communication hole 126 is formed in this manner, according to this embodiment, even when the piston 42 is vertically moved, the above-mentioned space communicates with an external portion through the communication hole 126, and air in this space will not exhibit an elastic force. As a result, a smooth downward movement of the piston 42 can be attained.

Figure 10A:
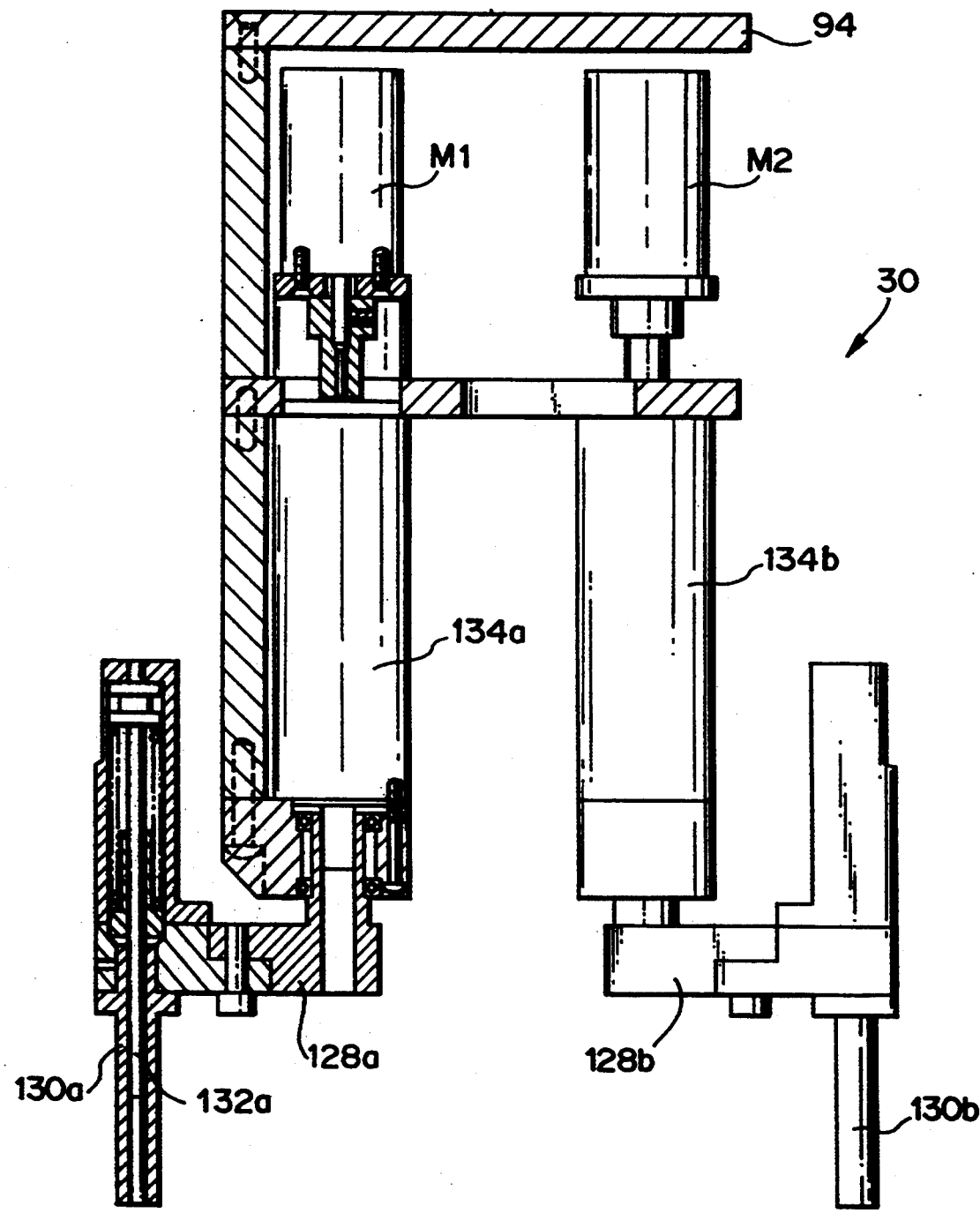
FIGS. 10A and 10B are respectively a front view and a bottom view showing a hand mechanism mounted on the robot of this embodiment.

The above-mentioned mounting plate 94 also serves as an upper plate of the hand mechanism 30 shown in FIG. 10A. In this embodiment, the number of constituting elements can be decreased in this manner, and the weight of the overall structure can be decreased. In addition, a length in a Z-axis direction can be shortened, and the overall structure can be rendered compact.

The ball support cylinder 48, the locking member 54, and the shank main body 86 constituting a contact portion in the hand attaching/detaching mechanism 10 with the above-mentioned structure are formed of stainless steel. The remaining constituting members are formed of aluminum to attain a lightweight structure. In FIG. 2, for the sake of easy understanding, sections of stainless steel portions are indicated by double hatching, and sections of aluminum portions are indicated by single hatching.

In this embodiment, since most of the constituting elements of the hand attaching/detaching mechanism 10 are formed of aluminum, the above-mentioned lightweight structure can be satisfactorily realized.

<Example of Hand>

Various hand mechanisms 30 can be prepared in accordance with gripping modes. The robot apparatus 12 is provided with a hand exchange station which holds a plurality of hand mechanisms having various structures, so that the robot apparatus 12 can mount an arbitrary hand mechanism. The hand structures are respectively supported on the hand bases 96 described above.

Figure 10B:
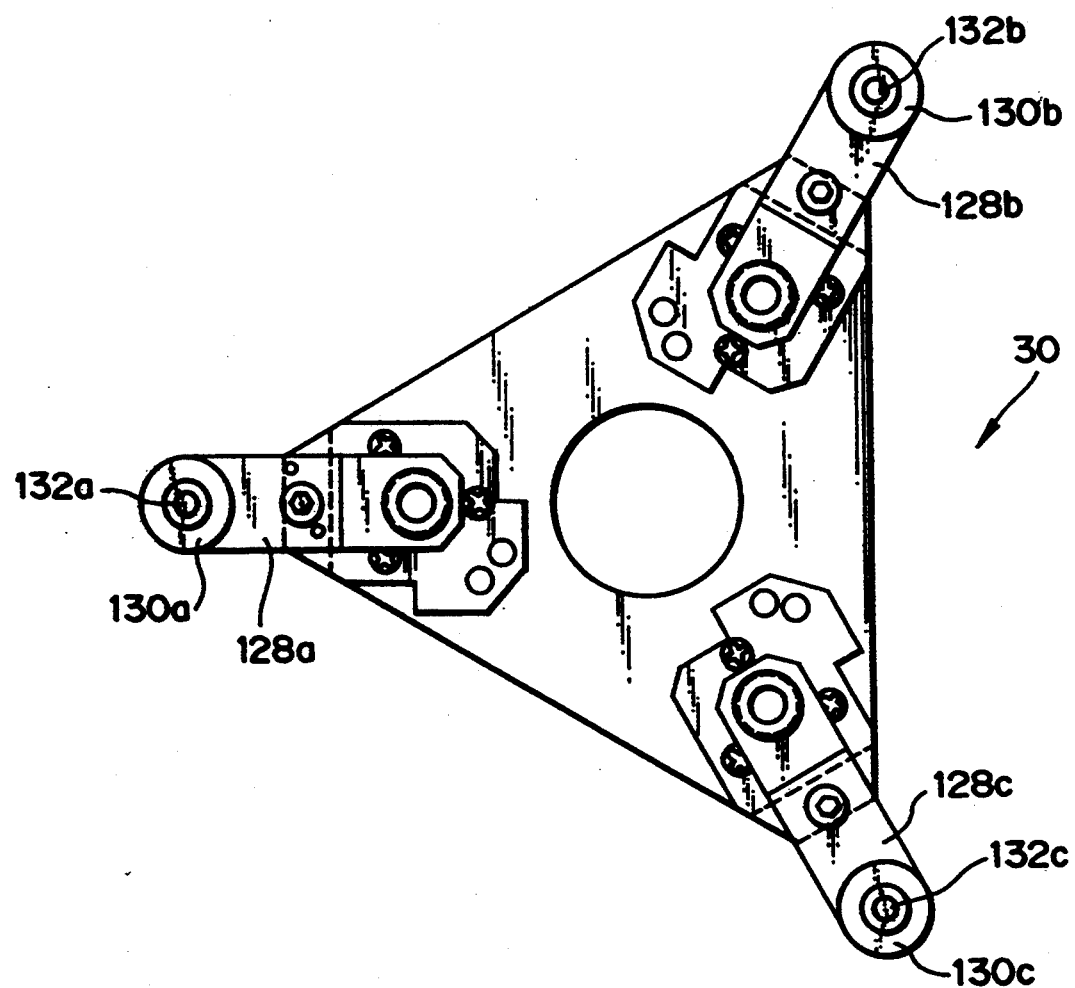

FIGS. 10A and 10B show a structure of an example of the hand mechanism 30. The hand mechanism 30 is basically the same as a parts gripping hand device disclosed in Japanese Patent Application No. 63-207359 filed by the same applicant as the present applicant, and a description of its detailed structure will be omitted. The hand mechanism 30 will be briefly described below. More specifically, the hand mechanism 30 comprises three arms 128a to 128c having, as their pivot centers, three points which are not located on the same straight line, hollow stationary fingers 130a to 130c which are arranged on the distal ends of the arms 128a to 128c, and are fixed to extend vertically, and movable fingers 132a to 132c which are vertically reciprocally stored in the fingers 130a to 130c.

The arms 128a to 128c are connected to corresponding driving motors $M_1$ to $M_3$ via reduction gears 134a to 124c so as to be pivoted about the above-mentioned points. The motors $M_1$ to $M_3$ are connected to predetermined connection lines of the connection line groups 118a and 118b, and are pivoted to arbitrary pivotal positions on the basis of control signals from the robot controller 28.

The movable fingers 132a to 132c serve as pistons when the corresponding stationary fingers 130a to 130c are assumed to be cylinders. The above-mentioned three connection hoses 115a to 115c are connected to the upper ends of the stationary fingers 130a to 130c, respectively.

The attaching/detaching operations of the hand mechanism 30 to/from the vertical arm 20 in the above-mentioned hand attaching/detaching mechanism 10 will be described below.

As shown in FIG. 2, a state wherein the hand attaching/detaching mechanism 10 couples the hand mechanism 30 to the vertical arm 20 is attained by a state wherein no actuation compressed air is introduced into the cylinder chamber 58 via the first air hose 32a, and the piston 42 is displaced upward by the biasing force of the coil spring 56. In this coupled state, the outward tapered surface 54a of the locking member 54 is also displaced upward according to the upward displacement of the piston 42, and the balls 52 are pushed out radially outwardly. As indicated by an alternate long and short dashed line, the balls 52 project radially outwardly from the corresponding ball support holes 48d, and are in contact with the hooking inward tapered surface 86e formed on the inward flange portion 86d of the shank 36.

In this embodiment, when the balls 52 are clamped between the hooking inward tapered surface 86e and the outward tapered surface 54a, the shank 36 is inhibited from being disengaged downward from the holder 34. In other words, the shank 36 can be reliably held by the holder 34, i.e., the hand mechanism 30 can be reliably coupled to the vertical arm 20.

When the hand mechanism 30 is released from this coupled state, actuation compressed air is introduced into the cylinder chamber 58 via the first air hose 32a. As shown in FIG. 5, when the compressed air is introduced, the piston 42 is pushed downward against the biasing force of the coil spring 56. As a result, as indicated by an alternate long and two short dashed line in FIG. 4, the outward tapered surface 54a is moved downward, and the outer circumferential surface of the main body portion 54b of the locking portion 54 is brought to a position opposing the ball support holes 48d.

As will be described later, when the hand mechanism 30 is detached from the vertical arm 20, the shank 36 connected to the hand mechanism 30 is supported on the corresponding hand base 96. More specifically, the shank 36 is locked by the hand base 96 so as not to be vertically movable. Therefore, when the vertical arm 20 is moved upward, the holder 34 of the hand attaching/detaching mechanism 10 is lifted up, and the balls 52 are displaced radially inwardly according to the slope of the hooking inward tapered surface 86e, and are in contact with the outer circumferential surface of the main body portion 54b.

Figure 9:
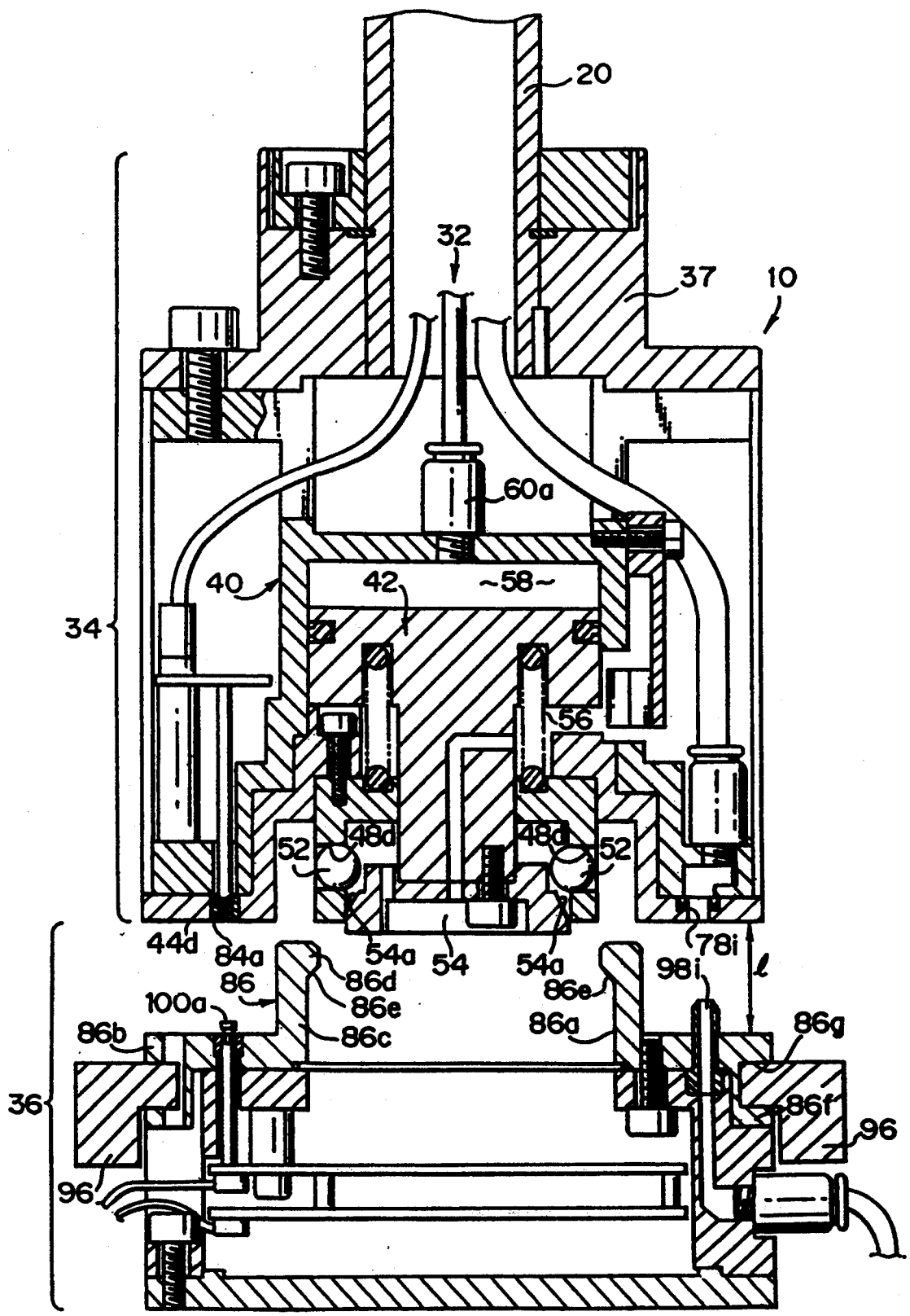
FIG. 9 is a longitudinal sectional view showing the hand attaching/detaching mechanism in a state wherein the holder is completely disengaged from the shank.

As a result, the balls 52 are completely concealed in the ball support holes 48d. In this manner, since there are no balls 52 for coupling the holder 34 and the shank 36, the holder 34 can be pulled upward from the shank 36, i.e., the hand mechanism 30 can be released from the vertical arm 20, and the vertical arm 20 can be moved upward while the hand mechanism 30 is separated. In this manner, when the vertical arm 20 is pulled up, as shown in FIG. 9, the holder 34 of the hand attaching/detaching mechanism 10 is separated from the shank 36, and can be lifted up. More specifically, the hand mechanism 30 is detached from the lower end of the vertical arm 20 via the hand attaching/detaching mechanism 10.

During a release operation in the hand attaching/detaching mechanism 10, i.e., during a pull-up operation of the holder 34 from the shank 36, internally engaged portions of the shank 36 and the holder 34 are only the lower portion of the projecting portion 42b of the piston 42 and the support cylinder main body 48a of the ball support cylinder 48, and its length is restricted to a very small value, as indicated by symbol l in FIG. 2.

As a result, in this embodiment, a Z-stroke for releasing the hand mechanism 30 from the vertical arm 20 need only be at least the above-mentioned distance l or more, and an exchange time can be shortened.

As described in detail above, according to this embodiment, the inner circumferential surface of the inward flange portion 86d of the shank main body 86 comprises the hooking inward tapered surface 86e. As a result, according to this embodiment, the overall structure can be simplified, and rendered lightweight, thus improving operation characteristics. In addition, a Z-stroke required for attaching/detaching operations can be shortened, and a time required for the attaching/detaching operations can be shortened. As a result, working efficiency can be improved.

A hand mechanism exchange operation in the robot apparatus 12 comprising the hand attaching/detaching mechanism 10 with the above structure will be briefly described below.

As shown in FIG. 1, when the hand mechanism 30 is coupled to the lower end of the vertical arm 20 via the hand attaching/detaching mechanism 10, predetermined pick and place operations of parts (not shown) corresponding to the hand mechanism 20 are executed. When pick and place operations of other parts which cannot be picked by this hand mechanism 30 must be executed, the hand mechanism 30 must be detached and exchanged with another hand mechanism suitable for the pick operation of these other parts.

When the hand mechanism must be exchanged, the robot controller 28 drives the first to fourth driving motors 21, 22, 24, and 26 to move the shank 36 from an opening side so that the shank 36 of the hand attaching/detaching mechanism 10 is supported on the predetermined hand base 96 of the hand exchange station. As a result, the shank 36 is supported on the hand base 96 in a state wherein the portions of the rack main body 96a for defining the two sides of the recess portion 96b of the hand base 96 are fitted, from two sides, in the locking groove 86g of the shank 36.

When the shank 36 is completely supported by the predetermined hand base 96, the robot controller 28 starts a pneumatic mechanism (not shown) to introduce compressed air into the cylinder chamber 58 of the hand attaching/detaching mechanism 10 via the first air hose 32a. As a result, a released state of the hand attaching/detaching mechanism 10 can be defined, and the holder 34 can be separated upward from the shank 36, as described above. Thereafter, the robot controller 28 confirms the separation enable state of the attaching/detaching device based on an ON operation of the lowermost position sensor 70 described above, and then starts the third driving motor 24 to vertically move the vertical arm 20 upward. In this manner, the holder 34 mounted on the lower end of the vertical arm 20 is lifted up from the shank 36 supported on the hand base 96, and is separated upward.

When it is detected that the upward moving amount of the vertical arm 20 reaches the above-mentioned separation stroke l, the robot controller 28 stops the third driving motor 24, and starts the first and second driving motors 21 and 22, so that the vertical arm 20 can be moved sideward while holding its vertical position, and is brought to a position immediately above another hand mechanism to be mounted. At this time, the controller 28 stops the first and second driving motors 21 and 22. When the arm is moved to a position immediately above the other hand mechanism, the fourth driving motor 26 is driven to pivot the arm about its central axis, so that the pivot position of the other hand mechanism to be coupled is precisely matched with its own pivot position.

Subsequently, the third driving motor 24 is driven to move the vertical arm 20 downward. When the vertical arm 20 is moved downward by only the above-mentioned stroke l, and the holder 34 is placed on the shank 36, the third driving motor 24 is stopped.

Thereafter, the robot controller 28 stops actuation of the pneumatic mechanism described above to release the pressure in the cylinder chamber 58. As a result, the piston 42 is moved upward by the biasing force of the coil spring 56, and the balls 52 are pushed by the outward tapered surface 54a of the locking member 54. Thus, the balls 52 are displaced radially outwardly, and project radially outwardly from the outer circumferential surface of the ball support cylinder 48. In this manner, as shown in FIG. 2, the balls 52 are clamped between the hooking inward tapered surface 86e and the outward tapered surface 54a, and the holder 34 and the shank 36 are coupled to each other. In this manner, another hand mechanism can be coupled to the lower portion of the vertical arm 20 via the hand attaching/detaching mechanism 10.

The robot controller 28 starts the first and second driving motors 21 and 22 again, thereby horizontally moving the vertical arm 20 from the opening side to be disengaged from the recess portion 96b of the hand base. Thereafter, the hand mechanism coupled to the lower end of the vertical arm is disengaged from the corresponding hand base, thus completing the exchange operation of the hand mechanism 30.

<Hand-Controller Interface>

A connection mechanism for electrically connecting the robot controller 28 and the hand mechanism 30 via the hand attaching/detaching mechanism 10 will be described in detail below with reference to FIG. 11 and subsequent drawings.

Figure 11:
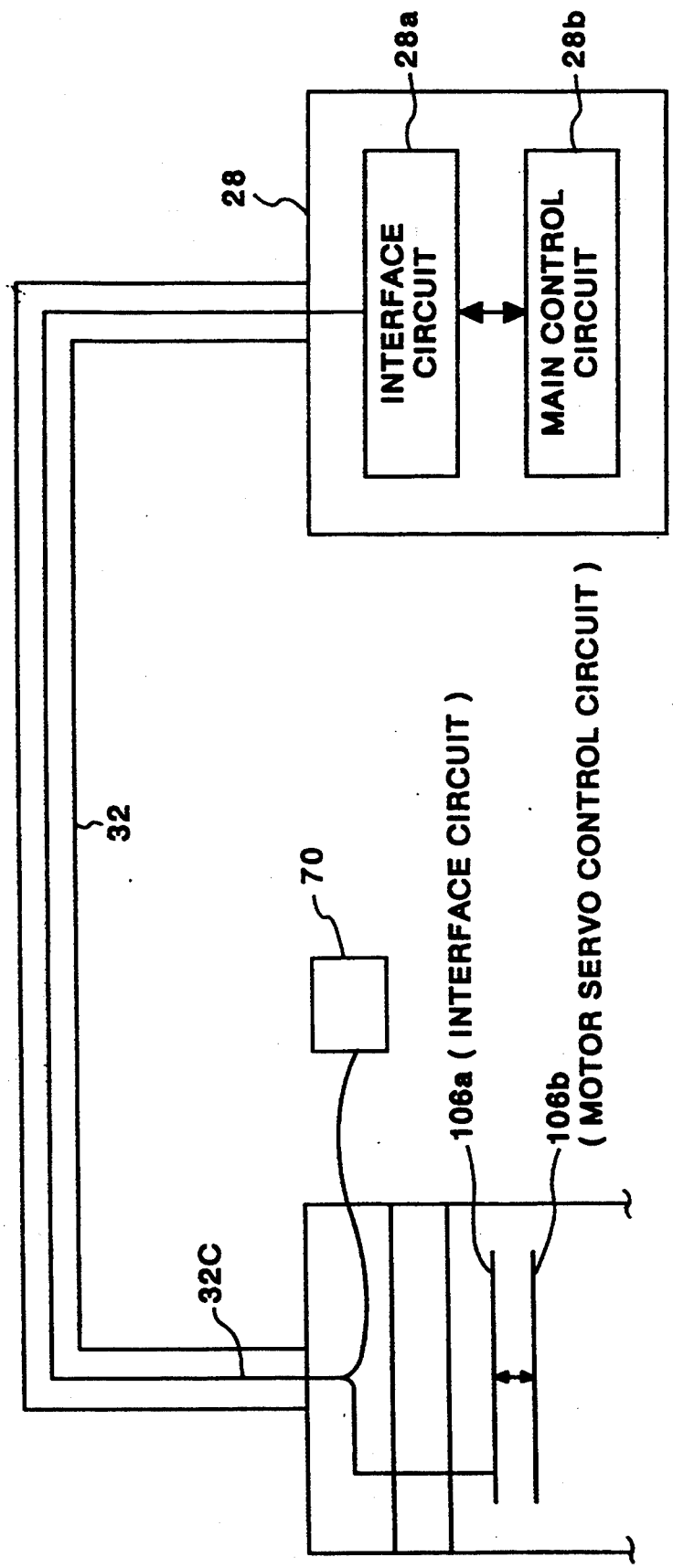
FIG. 11 is a block diagram for explaining an interface in the robot system shown in FIG. 1.

FIG. 11 is a schematic diagram showing electrical connections between the robot controller 28 and the hand mechanism 30 shown in FIG. 1. The same reference numerals as in FIG. 1 denote the same parts in FIG. 11 and subsequent drawings.

As shown in FIG. 11, an electrical/electronic circuit of the robot controller 28 and that of the hand mechanism 30 are connected via the cable bundle 32c described above, and the cable bundle 32c is connected to an interface circuit 106a in the hand mechanism via a cable connection/disconnection mechanism shown in FIGS. 6A and 6B. The cable bundle 32c is also connected to an interface circuit 28a in the controller 28. Actual robot control is executed by a main control circuit 28b under an algorithm controlled by a predetermined program. Actual drive control of servo motors shown in FIG. 10A as electrical/electronic devices mounted on the hand mechanism is executed by a motor/sensor control circuit 106b.

Interface Signal

Figure 12A:
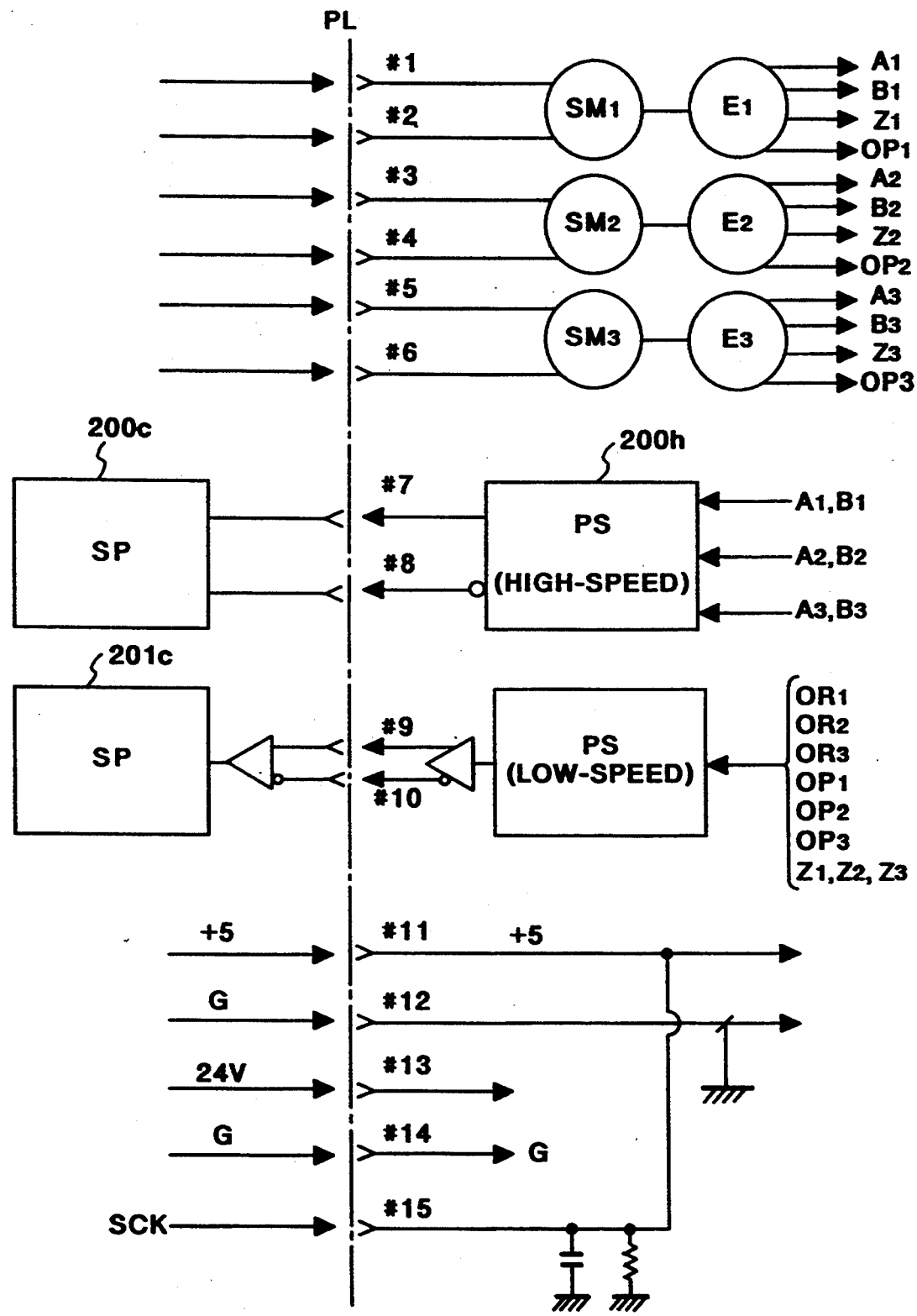
FIG. 12A is a diagram for explaining a connection relationship of signal lines in a hand attaching/detaching portion.

FIG. 12A schematically shows connections of signal lines in the attaching/detaching plane PL of the hand mechanism, and connections between the two interface circuits 28a and 106a. In FIG. 12A, a left side corresponds to the controller side, and a right side corresponds to a hand side.

In this embodiment, the hand mechanism 30 and the controller 28 exchange driving signals sent from the controller 28 side to the three servo motors ($SM_1$ to $SM_3$: FIG. 10A), signals sent from the hand side to the controller 28 such as rotational position signals, zero phase signals, and the like of these servo motors, and a power supply signal such as a +5 V signal. Signal lines are numbered by #1 to #15, and the following signals flow through these lines:

1, #2: Driving signals for servo motor $SM_1$
3, #4: Driving signals for servo motor $SM_2$
5, #6: Driving signals for servo motor $SM_3$
7, #8: Signals obtained by converting rotational position signals (A, B) from encoders $E_1$, $E_2$, and $E_3$ into multiplexed serial signal in predetermined format
9, #10: Signals obtained by converting signals OR each indicating that servo motor overruns, origin detection signals OP each indicating that servo motor is located at origin position, and zero phase signals of encoders from encoders $E_1$, $E_2$, and $E_3$ into multiplexed serial signals in predetermined format
11: 5 V (logic power supply) line
12: Logic ground line
13: 24 V line (power supply for, e.g., sensor)
14: Power supply ground line
15: Shank attachment signal (SCK)

Signals for driving the servo motors are directly transmitted to the hand side without being converted into serial signals since they require electrical power.

In FIG. 12A, reference numeral 200h denotes a parallel/serial (PS) conversion circuit for converting rotational position signals (A, B) from the encoders $E_1$, $E_2$, and $E_3$ into serial signals. Since these rotational position signals (A, B) have a relatively high frequency, one signal flows through the two signal lines (#7, #8) in a differential format. This serial signal is received by a serial/parallel (SP) conversion circuit 200c in the controller, and is restored to parallel signals to be used as data for predetermined robot control in the controller main body.

Relatively low-speed signals OR, OP, and Z from the encoders $E_1$ to $E_3$ are converted into a serial signal by a PS conversion circuit 201h. This serial signal is restored to original parallel signals by a SP conversion circuit 201c of the controller via the signal lines #9 and #10.

Whether or not the shank is actually connected to the arm can be detected by monitoring the signal SCK by the controller 28. When the shank is actually connected, a 5 V signal received from the controller via the signal line #11 is sent back to the controller as the signal SCK via a noise cancel circuit comprising capacitors and resistors, and the signal line #15. If this signal SCK is at high potential, the controller 28 determines that the shank is actually connected.

Figure 12B:
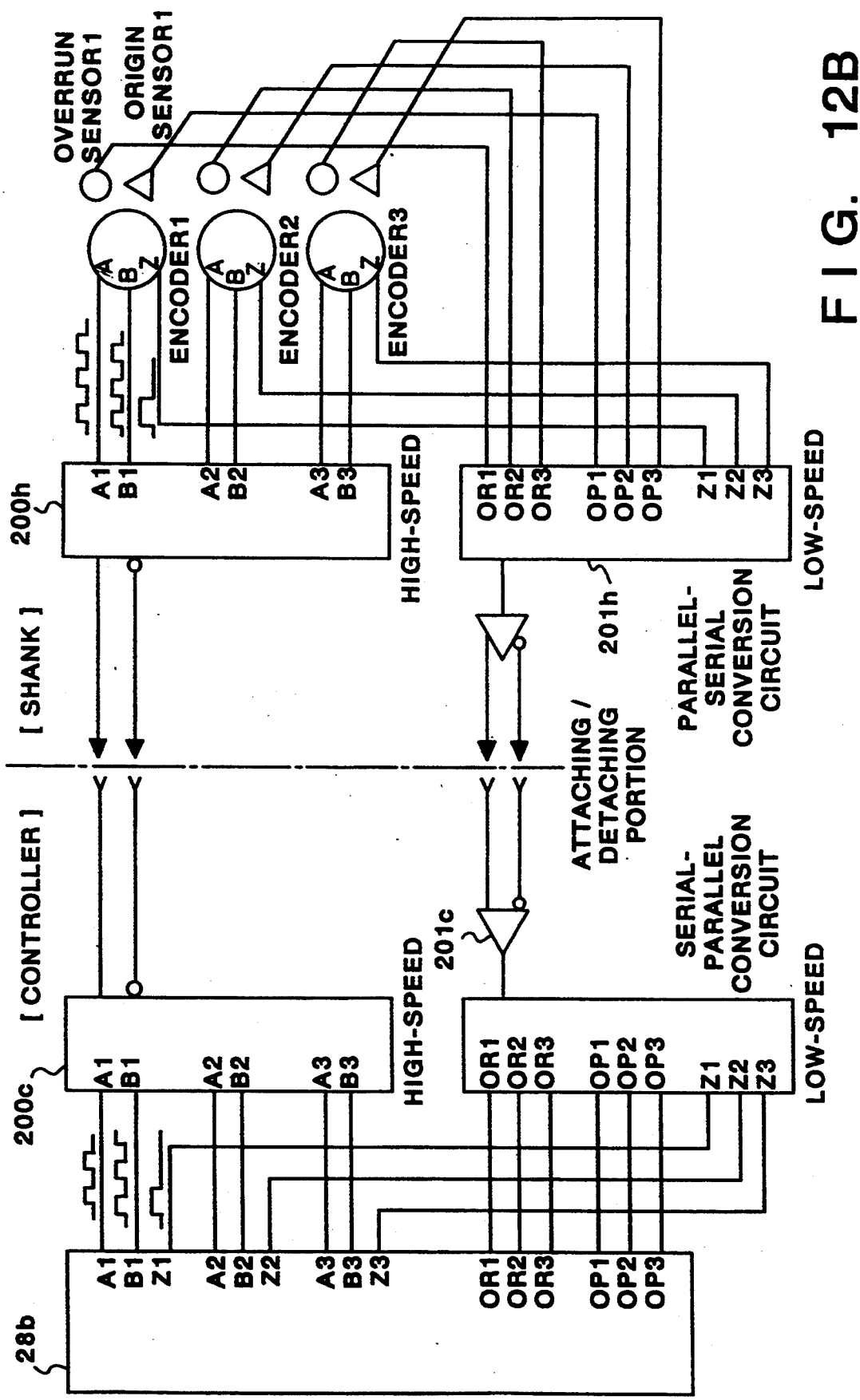
FIG. 12B is a block diagram showing an arrangement of a converting/decoding system of a serial/parallel signal.

FIG. 12B is a block diagram focusing mainly on serial interface signals of the elements shown in FIG. 12A.

PS and SP Conversion Circuits

Figure 13A:
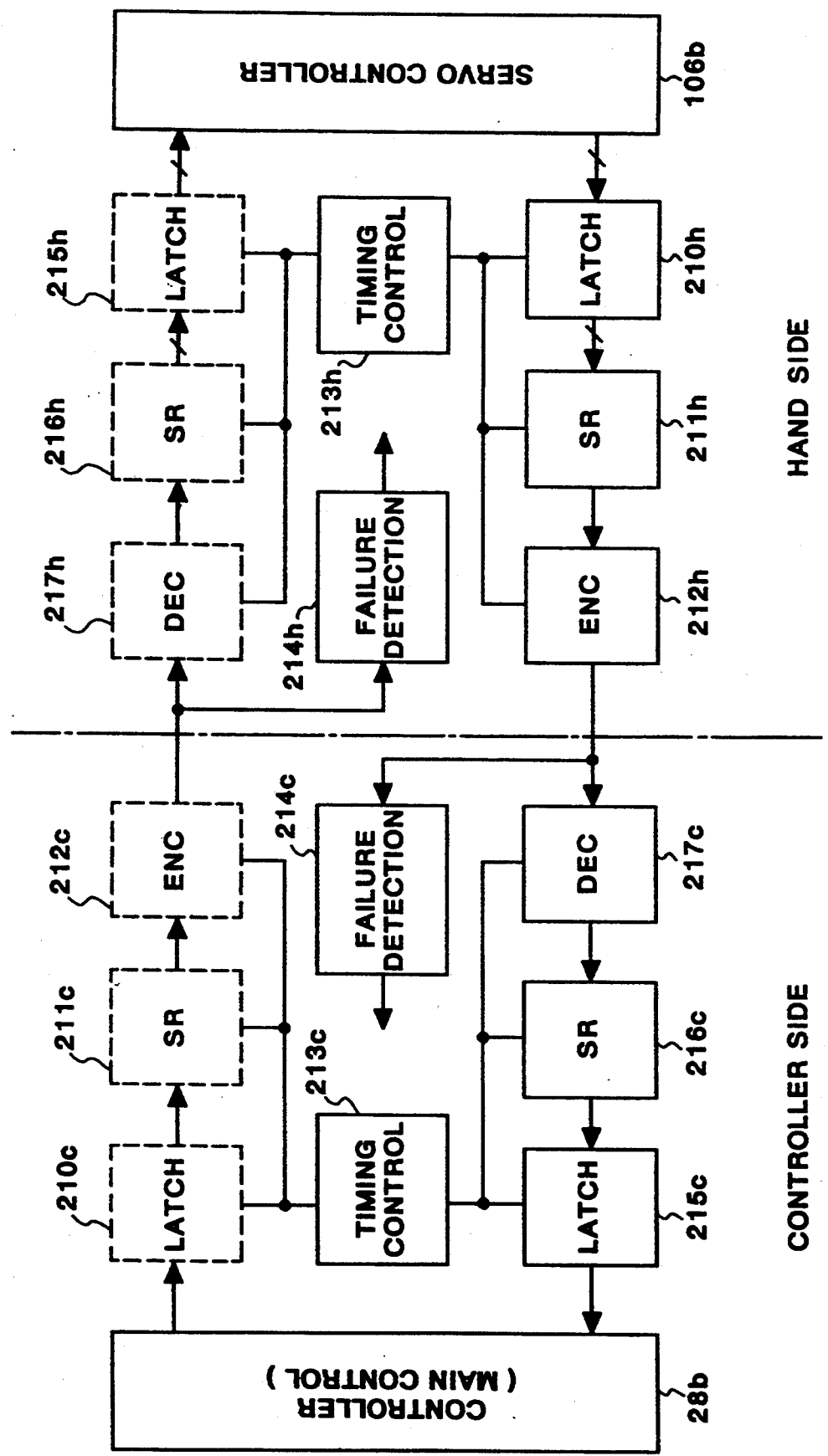
FIG. 13A is a block diagram of a converting/decoding circuit of a serial/parallel signal.

FIG. 13A is a block diagram showing an internal arrangement of the interface circuit 28a of the controller side and the interface circuit 106a of the hand side. Since the high- and low-speed interface circuits have the same arrangements, FIG. 13A illustrates only high-speed ones. Elements indicated by broken lines in FIG. 13A (e.g., latch 210c) are those for future extension of this embodiment, and are used to temporarily convert data generated by the controller 28 for the hand mechanism 30 into a serial signal by the interface circuit 28a of the controller 28, and to restore the serial signal into parallel signals by the interface circuit 106a of the hand side.

As for the hand mechanism shown in FIG. 1, servo motor driving signals as major signals to be transmitted from the controller to the hand mechanism are not subjected to PS/SP conversions. Therefore, the elements indicated by broken lines in FIG. 13A are not directly required in this embodiment. If signals from the controller are suitable for serial conversion depending on the kinds of hands, these signals are input to the circuit indicated by the broken lines.

Figure 14:
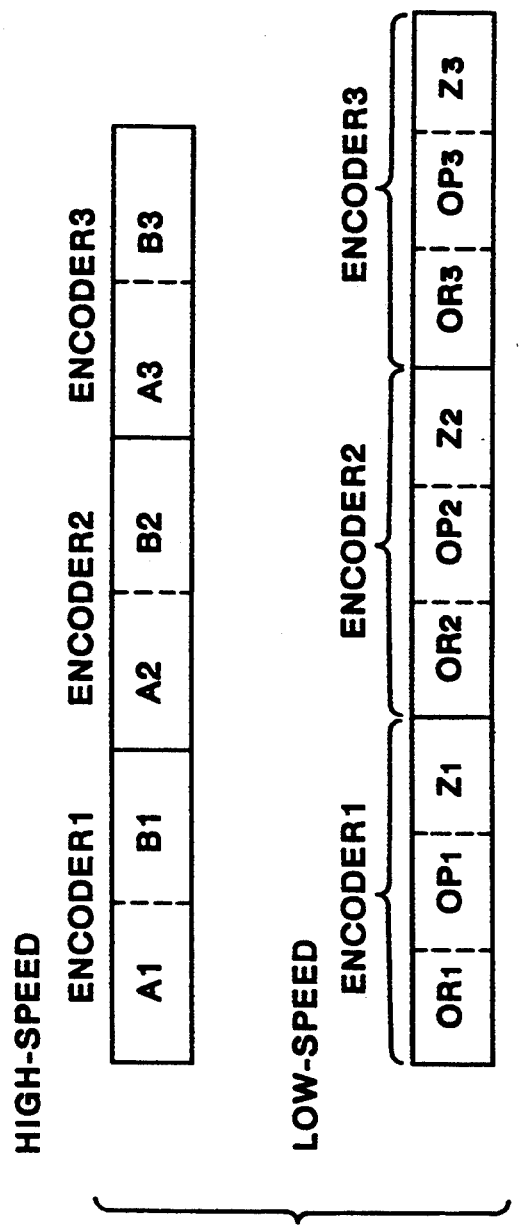
FIG. 14 shows a data format of a serial signal used in this embodiment.

FIG. 14 shows data formats on serial signal lines. In FIG. 14, a "High-speed" format is one used on the lines 7# and 8#, and a "Low-speed" format is one used on the lines #9 and #10.

In FIG. 13A, six signal data $A_1$, $B_1$, $A_2$, $B_2$, $A_3$, and $B_3$ from the encoders obtained by the servo control circuit 106b are latched in parallel by a latch 210h. These latched data loaded in parallel to a shift register (SR) 211h if all the data stored in the SR 211h in a previous cycle are sent to an encoder (ENC) 212h. The load timing is monitored by a timing control circuit 213h. The SR 211h sends this data loaded in parallel to the ENC 212h in an LSB (least significant bit)-first, bit-serial manner. The 212h encodes binary data from the SR 211h in accordance with an encoding system capable of generating a self clock, such as Manchester encoding, MFM encoding, or the like.

The encoded bit-serial binary data is input to a decoder of the interface circuit of the controller, and is decoded to original binary data. The binary data is input to an SR 216c in a bit-serial manner, and is converted into parallel data. The parallel data are latched by a latch 215c, and are then sent to the main control circuit 28b. As described above, parallel data generated by the servo control circuit 106b are converted into serial data by the interface circuit 28a, the serial data is transmitted through a transmission path and is converted into the parallel data by the interface circuit 106a, and the parallel data are sent to the main control circuit 28b.

<Failure Detection>

A failure detection circuit 214c monitors the presence/absence of an error of data on a serial signal line. As described above, serial data on the signal line is converted into, e.g., a Manchester code by the ENC 212h. The feature of this encoding is that a change in potential is generated on the signal line within a predetermined period. Therefore, the failure detection circuit 214c comprises, e.g., a one-shot circuit, as shown in FIG. 13B. A time-out period of this one-shot circuit is set to be slightly longer than the period of the encoded signal. If serial signal pulses are input to the timer before this timer is time-out, an error signal ERR will not be generated by the failure detection circuit 214c.

FIG. 13C is a diagram of the overall failure detection circuit 214c shown in FIG. 13A. Since the high-speed serial signal lines have a differential arrangement, two one-shot circuits 250 are arranged for each line. A comparator 251 detects disconnection of the signal line. In this manner, when disconnection of the signal line is detected or no encoded pulses of a serial signal are present on the signal line (due to, e.g., IC failure), the error signal ERR is output.

FIG. 15 is a detailed diagram of a failure detection system of this embodiment. This failure detection system aims at detecting errors on signal lines and their peripheral circuits, and preventing a hand detached state from being erroneously detected as a disconnection state since it is normal to detach/attach hands. FIG. 15 focuses on erroneous detection prevention in this detection system, and illustrates only the high-speed PS/SP conversion circuits for this purpose.

In FIG. 15, reference numeral 230 denotes a solenoid valve for controlling air supply for depressing the piston 42 for releasing the hand. This solenoid valve is activated by a signal UC (unclamp) which is enabled/disabled under the control of the main control circuit 28b. When the signal UC is at HIGH level (active), the shank 36 is moved downward, as has been described above with reference to FIG. 4, and the like, and the signal lines described above with reference to FIG. 12A are set in a "disconnection" state on the PL junction plane.

As has been described above with reference to FIG. 12A, voltage signals such as a 5 V signal, a 24 V signal, and the like are generated by a power supply circuit 231 in the controller 28. These voltage signals are supplied to a power supply circuit 233 of the hand mechanism through the lines #11 and #13 via contacts of a relay 232. The power supply circuit 233 arranged in the interface circuit 106a further generates various voltage signals used in, e.g., the servo control, circuit 106b based on the 5 V and 24 V voltage signals.

The relay 232 is controlled by the signal US from the controller. If the signal UC is at HIGH level (active), the relay 232 is energized, and its contacts are opened, thus inhibiting 5 V and 24 V voltage signals from being supplied to the hand mechanism.

Figure 16:
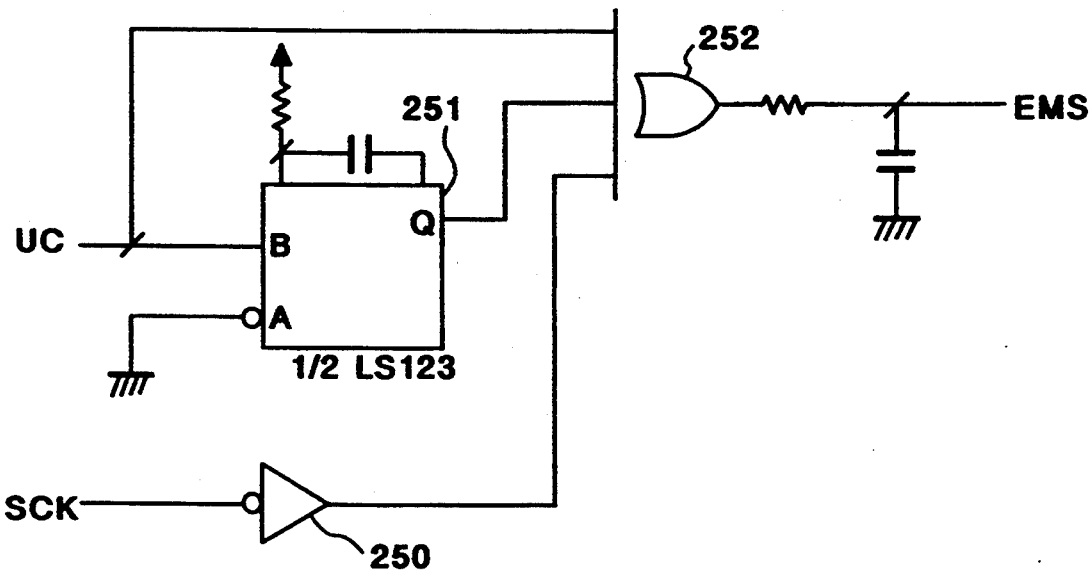
FIG. 16 is a circuit diagram of an error mask circuit 220.

FIG. 16 is a detailed circuit diagram of a communication error mask circuit 220 shown in FIG. 15. Reference numeral 251 denotes a one-shot circuit which goes to HIGH level within a predetermined time interval when an input signal changes from LOW level to HIGH level. The predetermined time interval is set to be a time required until a voltage generated by the power supply circuit 233 of the hand mechanism reaches a normal value when the power supply circuit 233 changes from an OFF state to an ON state. Therefore, an output EMS (enable mask signal) from an OR gate 252 goes to HIGH level:
  i) during a HIGH-level period of the signal UC;
  ii) during the predetermined high-level time interval after the signal UC changes from LOW level to HIGH level; or
  iii) while the signal SCK indicating that the hand is attached is set at LOW (false) level.

While this signal EMS is at HIGH level, even if the failure detection circuit 214c outputs the signal ERR, the signal ERR is disabled by an AND gate.

Figure 17:
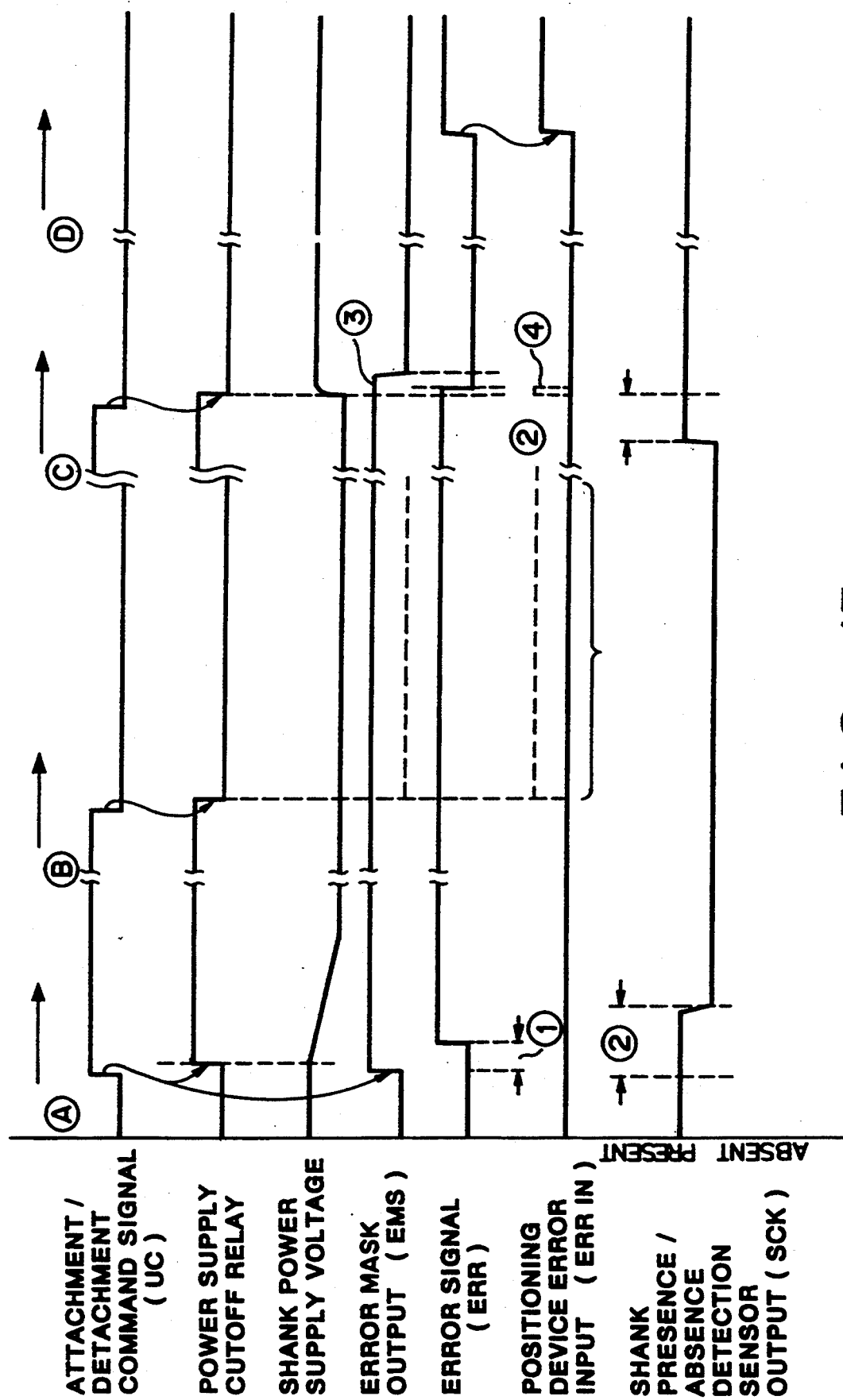
FIG. 17 is a timing chart for explaining an operation of the/error mask circuit 220.
Figure 20:
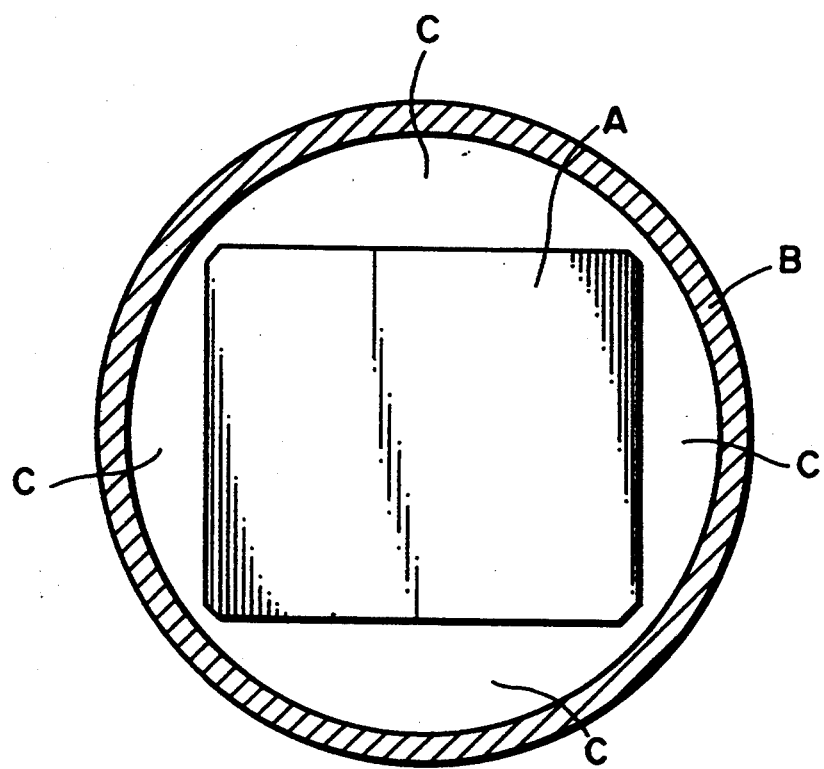
FIG. 20 is a view for explaining conventional problems.

An operation of the mask circuit will be described below with reference to the timing chart shown in FIG. 17. In FIG. 17, operations of this detection circuit classified into four cases (A to D) will explained below.

Operation A

In the operation A, a hand mechanism is detached in response to a hand detachment command UC from the controller. In FIG. 17, a time ① corresponds to a delay time of a change in ERR signal to HIGH level due to the presence of a voltage already charged in a capacitor of the power supply circuit 233 of the hand mechanism. A time ② corresponds to a time required for actually separating the contact of the signal line #15 when the shank is gradually disengaged. During a HIGH-level interval of the attachment/detachment signal US, the signal EMS is active. Therefore, even when the signal ERR becomes active, no error message is supplied to the controller.

Operation B

In the operation B, the attachment/detachment signal UC is changed from "detachment" level to "attachment" level without attaching the shank. In this case, although the solenoid valve 230 and the relay 232 are enabled, there is no serial signal on the signal lines, and the signal ERR is generated. However, since SCK=0, the signal EMS becomes active.

Operation C

In the operation C, the shank is attached. this case, the one-shot circuit 251 prolongs a generation time of the signal EMS by a time ③ in FIG. 17. Thus, information of the signal ERR is stopped.

Operation D

In the operation D, an error in a normal communication occurs while the shank is engaged with the holder. In this case, the signal ERR is correctly informed to the controller. <Effect of Robot Controller>

According to the robot controller of this embodiment described above, the following effects can be obtained:
  A: Since a plurality of kinds of signals are multiplexed and flow through serial communication lines in the attaching/detaching portion between the hand and arm, a design margin can be assured in the attaching/detaching portion whose space design is difficult, and a compact structure can also be attained. As a result, the weight of a robot movable portion can be decreased, and operation characteristics of a robot can be improved;

B: Since an error monitoring mechanism for serial communications is arranged, control precision can be improved; and C: Since a sensor for detecting a detached state of a hand and a circuit for masking generation of a failure are arranged, the hand detached state will not be erroneously detected as a disconnection of lines. In this case, during a transient state of a power supply of the hand mechanism like in a case wherein the hand state is changed from a detached state to an attached state, since the mask circuit is enabled, erroneous detection in the transient state can be prevented.

<Modification>

The present invention is not limited to the above embodiment, and various changes and modifications may be made within the spirit and scope of the invention.

For example, in the above embodiment, since the interface circuit is arranged in the controller, serial communications can be realized over the entire arm of the robot, and a lightweight, compact structure can be achieved. However, the present invention is not limited to this arrangement. For example, the interface circuit of the controller side may be arranged in the controller side near the attaching/detaching portion as long as a design space margin of the hand attaching/detaching portion can be assured. With this modification, although the number of signal lines in the arm is increased as compared to the above embodiment wherein serial communications are performed in the arm, at least the number of signal lines in the attaching/detaching portion which has a small space margin can be decreased as compared to a conventional system.

Figure 18:
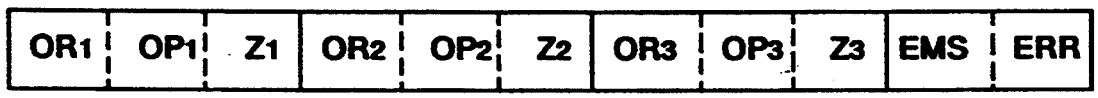
FIG. 18 is a view for explaining a data format of a serial signal according to a modification of the failure detection system shown in FIG. 15.
Figure 19:
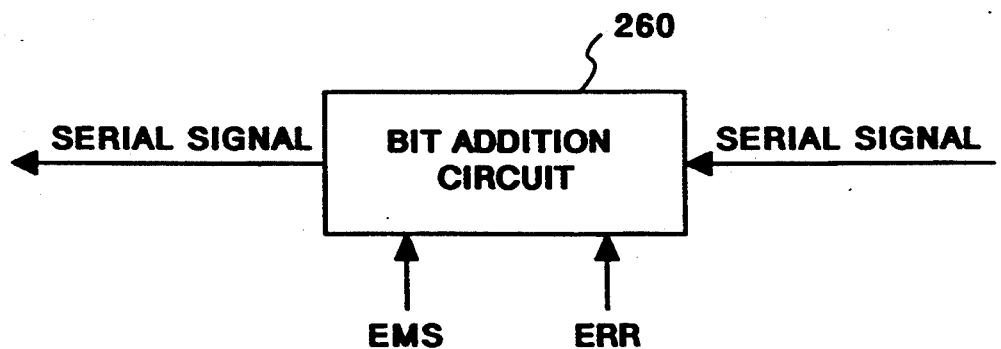
FIG. 19 a block diagram of a bit addition circuit of the modification.

In the above embodiment, the mask circuit 220 is arranged in the controller 28. In addition, signal lines for signals ERR, EMS, and the like employ those different from the serial signal lines. However, the present invention is not limited to this. For example, the signals ERR, EMS, and the like may also be multiplexed. More specifically, in this modification, signal fields for the signals ERR, EMS, and the like are added to a low-speed serial signal format (FIG. 14), as shown in FIG. 18. Reference numeral 260 in FIG. 19 denotes a circuit for adding these signals ERR, EMS, and the like. In this modification, the mask circuit 220 must be arranged near the bit addition circuit 260.

In a serial signal interface employed in the above embodiment, logic "1" has priority over logic "0". For this reason, even if EMS and ERR fields of a serial signal sent from the hand side are zero, the bit addition circuit 260 need only add the EMS and ERR logic values at that time at bit timings of the EMS and ERR fields, thus adding the EMS and ERR signal values on the serial signal lines. In this manner, the number of signal lines between the attaching/detaching portion and the controller main body can be decreased.

In the above embodiment, the error signal ERR is masked in a hardware manner. However, the present invention is not limited to this. For example, the signals EMS and ERR may be read by a program in the controller 28, and error mask processing may be executed in a software manner.

Various sensors for detecting an attached/detached state of the hand or shank are available. For example, an attached/detached state may be monitored not by a sensor arranged in the attaching/detaching portion but by a sensor of another system. For example, a pneumatic pressure for attaching/detaching the shank may be checked.

As many apparently widely different embodiments of the present invention can be made without departing from the spirit and scope thereof, it is to be understood that the invention is not limited to the specific embodiments thereof except as defined in the appended claims.

What is claimed is:

1. A robot apparatus capable of having various robot hands attached and/or detached, said apparatus operating in accordance with a signal from an external robot controller and comprising:

a robot arm;

electrical driving means included in a robot hand mounted on said robot arm for controlling operation of the robot hand;

hand attaching/detaching means, arranged between said robot arm and the robot hand, for detachably mounting the robot hand on said robot arm;

signal transmission path means, one end of which is connected to the external robot controller and the other end thereof connected to said electrical driving means in the robot hand, extending through said hand attaching/detaching means and said robot arm and the robot hand and is able to be disconnected between a robot hand side and a robot arm side of said hand attaching/detaching means, for transmitting a plurality of kinds of position signals representing a position of the robot hand in a multiplexed serial format from the robot hand to the external robot controller; and a first signal conversion circuit, arranged in the robot hand for converting the plurality of position signals from said electrical driving means into a single multiplexed serial signal and outputting the multiplexed serial signal to the external robot controller.

2. The apparatus according to claim 1, further comprising an external robot controller for controlling said robot arm, wherein said external robot controller includes a second signal conversion circuit for converting the position signal which represents a position of the robot hand as a multiplexed serial format signal supplied from said electrical drive means to said external robot controller into a multiple parallel signal format.

3. The apparatus according to claim 1, wherein said hand attaching/detaching means includes:

a holder fixed to the robot arm side;

a shank fixed to the robot hand side, and detachably mounted on said holder; and said shank being formed into a substantially cylindrical hollow shape.

4. The apparatus according to claim 3, wherein said first signal conversion circuit is arranged in said shank.

5. The apparatus according to claim 3, wherein said first signal conversion circuit has a circuit board formed into a substantially disk shape to have an outer periphery adjacent to an inner circumferential surface of said shank.

6. The apparatus according to claim 5, wherein said signal transmission path means comprises a plurality of connection terminals arranged on junction surfaces between said holder and said shank so that said connection terminals can be connected or disconnected in accordance with an attachment/detachment operation between said holder and said shank.

7. The apparatus according to claim 6, wherein said connection terminals on said shank side are circumferentially arranged on an outer periphery of said substantially disk-shaped circuit board.

8. The apparatus according to claim 1, wherein said signal transmission path means comprises a signal cable which is provided within interior portions of said hand attaching/detaching means, said robot arm and the robot hand.

9. The apparatus according to claim 1, wherein one of the position signals represents an output signal of a position encoder which is built in the robot hand and which is connected to fingers of the robot hand.

* * * * *

UNITED STATES PATENT AND TRADEMARK OFFICE
CERTIFICATE OF CORRECTION

PATENT NO. : 5,425,133
DATED : June 13, 1995
INVENTOR(S) : Yasuhara et al.

It is certified that error appears in the above-indentified patent and that said Letters Patent is hereby corrected as shown below:

ON THE TITLE PAGE:
Item [54]. Title;
"ROTOR" should read --ROBOT--.

[56] REFERENCES CITED:

FOREIGN PATENT DOCUMENTS, "58186589" should read --58-186589--.

[57] ABSTRACT:

Line 7, "path," should read --path--.
Line 15, "format;" should read --format.--
Line 16, "a first" should read --A first--.
Line 18, "output" should read --outputs--.
Line 21, "signals," should read --signal--.

COLUMN 1:

Line 4, "ROTOR" should read --ROBOT--.

COLUMN 3:

Line 34, "end" should read --and--.

COLUMN 5:

Line 43, "the/error" should read --the error--.

UNITED STATES PATENT AND TRADEMARK OFFICE
CERTIFICATE OF CORRECTION

PATENT NO. : 5,425,133
DATED : June 13, 1995
INVENTOR(S) : Yasuhara et al.

It is certified that error appears in the above-indentified patent and that said Letters Patent is hereby corrected as shown below:

COLUMN 7:

Line 20, "flange;" should read --flange--.
Line 36, "simplicity" should read --simplicity)--.

COLUMN 8:

Line 35, "shape;" should read --shape--.

COLUMN 14:

Line 19, "hoses 115a to 115c" should read --hoses 114a to 114c--.
Line 24, "hoses 115a to 115c" should read --hoses 114a to 114c--.

COLUMN 16:

Line 18, "124c" should read --134c--.

COLUMN 19:

Line 52, "0P" should read --OP--.

COLUMN 20:

Line 62, "212h" should read --ENC 212h--.

UNITED STATES PATENT AND TRADEMARK OFFICE
CERTIFICATE OF CORRECTION

PATENT NO. : 5,425,133
DATED : June 13, 1995
INVENTOR(S) : Yasuhara et al.

It is certified that error appears in the above-indentified patent and that said Letters Patent is hereby corrected as shown below:

COLUMN 21:

Line 66, "signal US" should read --signal UC--.

COLUMN 22:

Line 39, "signal US," should read --signal UC,--.

COLUMN 24:

Line 55, "side," should read --side--.

Signed and Sealed this

Fifth Day of December, 1995

Attest:

BRUCE LEHMAN

Attesting Officer     Commissioner of Patents and Trademarks